(12) United States Patent
Kamei et al.

(10) Patent No.: US 8,015,157 B2
(45) Date of Patent: Sep. 6, 2011

(54) FILE SHARING SYSTEM, FILE SERVER, AND METHOD FOR MANAGING FILES

(75) Inventors: Hitoshi Kamei, Sagamihara (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 12/385,438

(22) Filed: Apr. 8, 2009

(65) Prior Publication Data
US 2010/0211547 A1    Aug. 19, 2010

(30) Foreign Application Priority Data

Feb. 18, 2009    (JP) ................................ 2009-034730

(51) Int. Cl.
*G06F 17/30*    (2006.01)
(52) U.S. Cl. ...................... 707/649; 707/812; 711/114
(58) Field of Classification Search .............. 707/649, 707/812; 709/223; 711/114
See application file for complete search history.

(56) References Cited

U.S. PATENT DOCUMENTS

| | | |
|---|---|---|
| 2004/0193760 A1 | 9/2004 | Matsunami et al. |
| 2007/0198605 A1* | 8/2007 | Saika ............................. 707/202 |
| 2007/0233978 A1 | 10/2007 | Nakano et al. |

FOREIGN PATENT DOCUMENTS

JP    2004-342050    6/2003

OTHER PUBLICATIONS

U.S. Appl. No. 12/348,339, filed Jan. 5, 2009.

* cited by examiner

*Primary Examiner* — Belix M Ortiz
(74) *Attorney, Agent, or Firm* — Stites & Harbison PLLC; Juan Carlos A. Marquez, Esq.

(57) ABSTRACT

In the HSM function, when supporting the file system snapshot function, a differential data volume is required for both a high-speed volume and a low-speed volume. Accordingly, when supporting the snapshot function by using a file system provided by the HSM function, a large amount of differential data volume is required. When the manager gives an instruction to acquire a snapshot, a snapshot management program executes snapshot acquisition processing to acquire a snapshot. In this processing, a snapshot reference relation building processing part copies a file storage location management table, and relates the file storage location management table to the acquired snapshot. Then, the snapshot reference relation building processing part checks a file that is migrated to a file system which does not have a differential data volume. Finally, the snapshot reference relation building processing part creates a link of the migrated file to the snapshot which is acquired previous time.

13 Claims, 18 Drawing Sheets

FIG.11

1706 Snapshot management table

| Mount path | Snapshot name | File storage location management table name | Creation time point |
|---|---|---|---|
| /snap_1 | snap_1 | snap_1_store | 2008/01/01-10:00 |
| /snap_2 | snap_2 | snap_2_store | 2008/01/02-11:00 |
| | | | |

1901  1902  1903  1904

1712 File storage location management table

1712A

| File name | Storage location file name | Storage location file system | Modification flag |
|---|---|---|---|
| /FILE1 | /DIR1/FILE1 | FSA | 0 |
| /FILE2 | /DIR2/FILE2 | FSB | 1 |
|  |  |  |  | copy  Snapshot acquisition

1712B

| File name | Storage location file name | Storage location file system | Modification flag |
|---|---|---|---|
| /FILE1 | /snap_1/FILE1 | FSA | 0 |
| /FILE2 | /snap_2/FILE2 | FSB | 1 |
|  |  |  |  |

FIG.18

1712 File storage location management table

1712B

| File name | Storage location file name | Storage location file system |
|---|---|---|
| /FILE1 | /snap_1/FILE1 | FSA |
| /FILE2 | /DIR2/FILE1 | FSB |
| /FILE3 | /DIR2/FILE3_old_1 | FSB |

2001 / 2002 / 2003

FILE SHARING SYSTEM, FILE SERVER, AND METHOD FOR MANAGING FILES

CROSS REFERENCES TO RELATED APPLICATIONS

This application claims priority of Japanese Patent Application No. 2009-034730, filed on Feb. 18, 2009, the entirety of which is incorporated by reference herein.

BACKGROUND OF THE INVENTION

1. Field of the Invention

The present invention relates to a file management that uses one or more storage devices and optimally disposes files in accordance with the properties of a file system, in which file system snapshots are acquired.

2. Description of the Related Art

Currently, storage devices provided with various performances have been developed, and performances of volumes forming these storage devices are different from each other. Generally, a volume of high performance is expensive, and cannot have much capacity. On the other hand, a volume of low performance is inexpensive, and can have much capacity.

There is known a method for managing data referred to as the HSM function (Hierarchical Storage Management function) that optimally disposes files, in which a plurality of volumes of different properties are utilized to reduce the cost of storage. In the HSM function, the file system program migrates a frequently used file to a high-speed and expensive volume, and migrates an infrequently used file to a low-speed and inexpensive volume. In this way, the HSM function controls file-storing volumes, which can reduce the cost of storage.

The HSM function disclosed in a patent document 1 (US2004/0193760A1) creates a file system using a high-speed volume and a low-speed volume, in which a file system program sends an instruction to migrate an unutilized file to the low-speed volume. Then, when an application accesses the file, the file is migrated to the low-speed volume. In this processing, the file system rewrites file management information of the high-speed volume.

On the other hand, there is known the file system snapshot function (which may be simply referred to as snapshot function, hereinafter) which is disclosed in a patent document 2 (Japanese Laid-Open Patent Publication No. 2004-342050). The file system snapshot function can easily recover an original file when the user deletes the file or modifies the file by mistake. The file system snapshot function acquires a file system image of a specific time point like a "photograph (snapshot)". The user can recover a file, which is deleted by mistake, by acquiring the file from the snapshot. The snapshot function has a special volume referred to as a "differential data volume" to store data of a deleted file or a modified file.

In the HSM function disclosed in the patent document 1, when supporting the file system snapshot function, a differential data volume is required for both a high-speed volume (LU (Logical Unit) created with FC (Fibre Channel) Disk) and a low-speed volume (LU created with SATA (Serial Advanced Technology Attachment) Disk). Accordingly, when supporting the snapshot function using a file system provided by the HSM function, a differential data volume of large amount is required.

SUMMARY OF THE INVENTION

It is therefore an object of the present invention to overcome the above-mentioned drawback to reduce a required volume in file management using the snapshot function of a file system.

The present invention provides a file-sharing system (which may be simply referred to as system, hereinafter) that includes a storage device, a file server, a computer, and a management terminal (computer). The storage device stores data of a file system, snapshots, and management information of the HSM function (file storage location management table). The file server is connected to the storage device. The computer requests a file access to the file server. The management terminal manages the system.

The file server includes a snapshot management program, an HSM program, a snapshot management table, and a file storage location management table. The snapshot management program manages the snapshot function. The HSM program manages the HSM function. The snapshot management table stores snapshot information. The file storage location management table stores a storage location file system of a file determined by a file optimal disposition operation of the HSM function.

The HSM program includes a file system integration processing part, a file migration processing part, a file access processing part, and a snapshot reference relation building processing part.

When a manager gives the system an instruction to acquire a snapshot, the snapshot management program executes snapshot acquisition processing to acquire a snapshot. In this processing, the snapshot reference relation building processing part of the HSM program copies the original file storage location management table, and relates the copied file storage location management table to the acquired snapshot by changing a file path using a mount path of the snapshot. Then, the snapshot reference relation building processing part checks a file which is migrated to a file system which does not have a volume (differential data volume) that stores snapshot data (or a file which is originally stored). Finally, the snapshot reference relation building processing part creates a link of the migrated file or copies an originally stored file to the snapshot which is acquired previous time.

In this way, the file access processing part traces a link or a copy for a file which does not actually exists in a snapshot, and a client (computer) can access the file as if the file exists in the snapshot.

Details of the processing will be described later.

According to the present invention, it becomes possible to reduce a required volume for the file management using the snapshot function of the file system.

BRIEF DESCRIPTION OF THE DRAWINGS

FIG. 11 shows a view representing an example of a snapshot management table;

FIG. 18 shows a view representing an example of a file storage location management table of the second embodiment;

DESCRIPTION OF THE PREFERRED EMBODIMENTS

Hereinafter, a preferred embodiment will be explained by employing a unified file system that uses a file system A (referred to as file system A or FSA, hereinafter) created on a high-speed volume which is formed by an FC (Fibre Channel) disk drive, and a file system B (referred to as file system B or FSB, hereinafter) created on a low-speed volume which is formed by a SATA (Serial Advanced Technology Attachment) disk drive.

The embodiment to be described hereinafter is one example, and the present invention is not restricted to this embodiment. Similarly, the high-speed volume may be formed by a drive other than the FC disk drive. Furthermore, the low-speed volume may be formed by a drive other than the SATA disk drive.

First Embodiment

Figure 1:
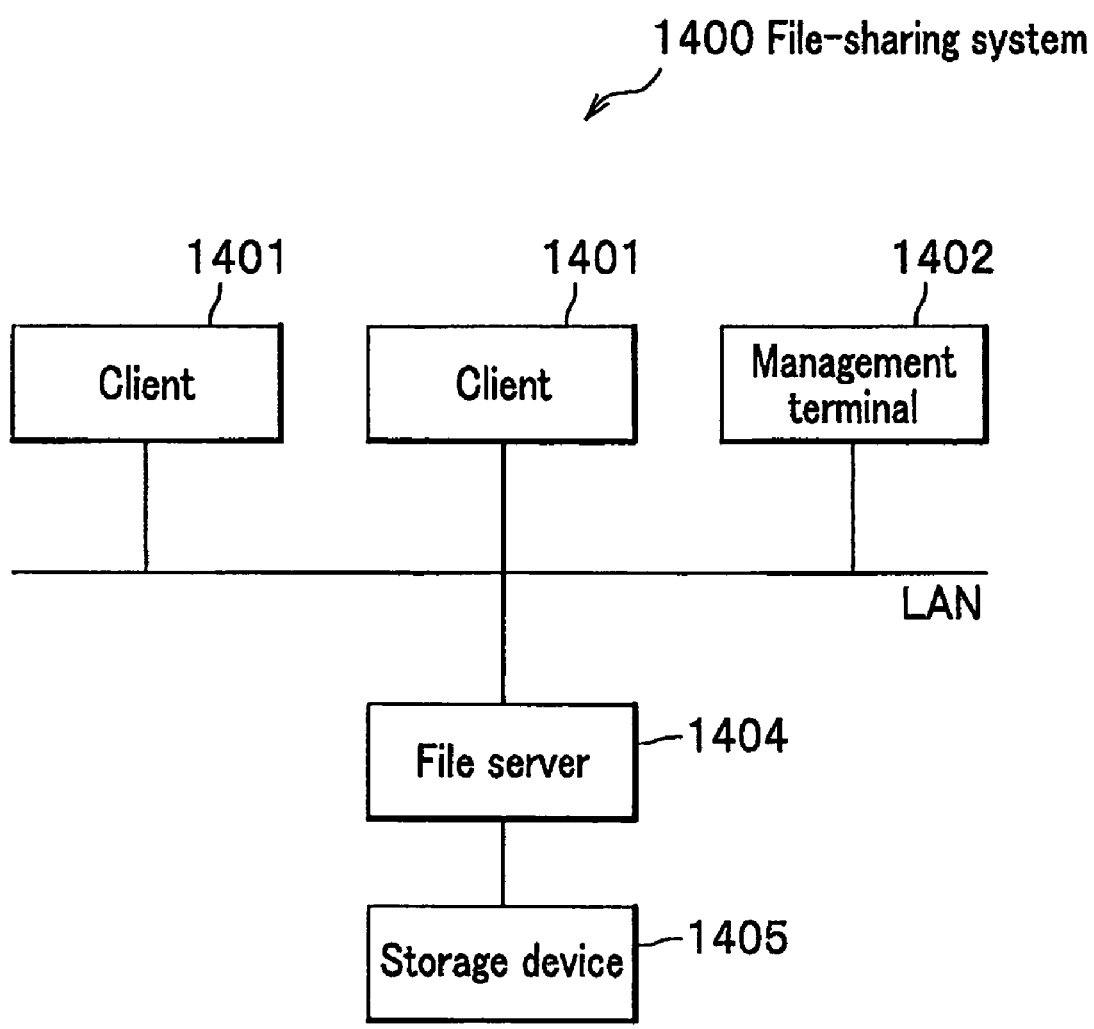
FIG. 1 shows a schematic view representing a file-sharing system.

FIG. 1 shows a schematic view representing a file-sharing system 1400 according to an embodiment of the present invention. The file-sharing system 1400 includes clients 1401, a management terminal 1402, a file server 1404, and a storage device 1405.

The client 1401 is a computer which is used by a user who uses the file-sharing system 1400. The details of the internal configuration and internal processing of the client 1401 will be explained later.

The management terminal 1402 is a computer that manages the file-sharing system 1400, and is used by a manager who manages the file-sharing system 1400. The details of the internal configuration and internal processing of the management terminal 1402 will be explained later.

The file server 1404 is a computer that provides the client 1401 with a file-sharing service in the file-sharing system 1400. The details of the internal configuration and internal processing of the file server 1404 will be explained later.

The clients 1401, the management terminal 1402, and the file server 1404 are connected to one another through a LAN (Local Area Network). On the other hand, the clients 1401, the management terminal 1402, and the file server 1404 may be connected through a connection mode other than the LAN such as the radio communication, and the present invention does not restrict the connection mode.

The storage device 1405 is a storage device that stores data of a file sent from the file server 1404 when the client 1401 sends data of a file to the file server 1404. The details of the internal configuration and internal processing of the storage device 1405 will be explained later. The storage device 1405 and the file server 1404 may be connected through the SAN (Storage Area Network), or may be directly connected. The present invention is not restricted on the connection mode.

The processing of acquiring a snapshot in the unified file system, which will be explained by referring to FIG. 2 through FIG. 6 hereinafter, is executed by the file server 1404. Furthermore, the snapshot of the unified file system is provided for the client 1401 or the management terminal 1402.

Hereinafter, referring to FIG. 2 through FIG. 6, the general outline of the technique of creating a plurality of snapshots and the technique of providing the plural snapshots to a client by the file server 1404 will be explained. This general outline does not restrict the scope of the claimed invention, and does not abandon the patentability of the disclosure of the present specification which is not written in the general outline. Similarly, this general outline explains a case in which the number of file systems is two, a case in which the number of snapshots is four or six, and specific time points for the sake of simplifying the explanation, and these are examples. If not otherwise specified, all the processings to be described below will be performed by the file server 1404.

Figure 2:
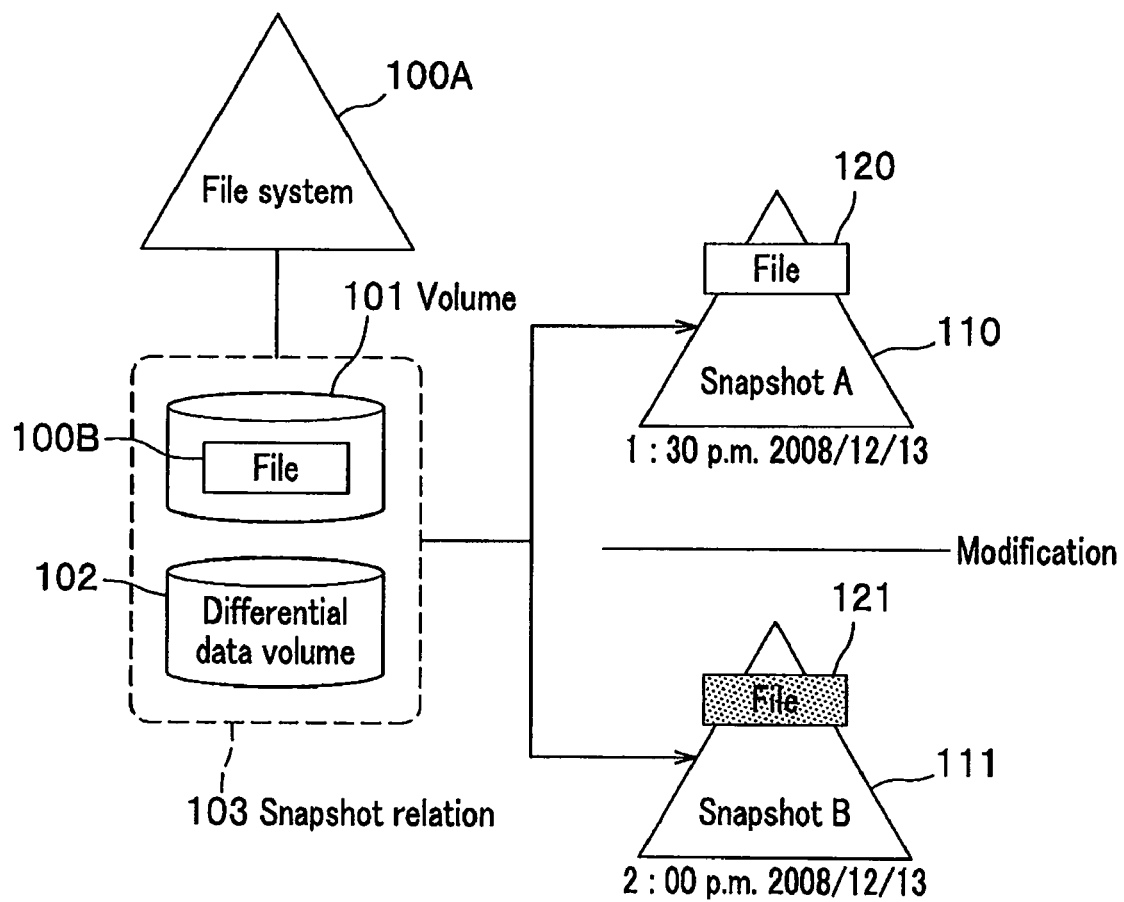
FIG. 2 shows a schematic view representing an example of file system snapshots.

FIG. 2 shows a schematic view representing an example of file system snapshots.

The snapshot is a special file system image having the state of a file system at a specific time point. The file system snapshot of a file system 100A includes a volume 101 in which a file 100B of the file system 100A is stored, and a differential data volume 102 that stores differential data indicative of the difference between a file before modification and a modified file which is created when the file 100B managed by the file system 100A is modified. These volumes are managed as a snapshot relation 103 (or it can be said that the volume 101 and differential data volume 102 have the snapshot relation 103). The snapshot may be repeatedly created with a timing (for example, at a regular interval) predetermined by the file server 1404, or may be created by the file server 1404 in response to a snapshot creating request sent from the client 1401 or management terminal 1402. The timing for creating the snapshots may be determined by employing other methods.

The file system has a function of providing a structure that manages data to be dealt with in a computer system by a user with a unit being a file, and indicates a unit of management provided by the function. A program that provides the function is referred to as a file system program. The "file system" described in the present invention mainly indicates a unit of management provided by the file system program.

A snapshot A 110 of the file system 100A is a snapshot of the file system 100A created at 1:30 p.m. Dec. 13, 2008. A snapshot B 111 of the file system 100A is a snapshot of the file system 100A created at 2:00 p.m. Dec. 13, 2008.

When the snapshot A 110 is acquired, if the file 100B is created for the file system 100A, the file 100B at the time of acquiring the snapshot is managed as a file 120 by the snapshot A 110.

If a user modifies the file 100B during a time period from a time point when the snapshot A 110 is acquired to a time point when the snapshot B 111 is acquired, a file 121 which is the file 100B after modification (file 100B which is managed by the snapshot B 111, and is modified) is represented in the snapshot B 111.

Accordingly, the file system snapshot is provided with a function of restoring the state of a file system at a specific time point using differential data.

Figure 3:
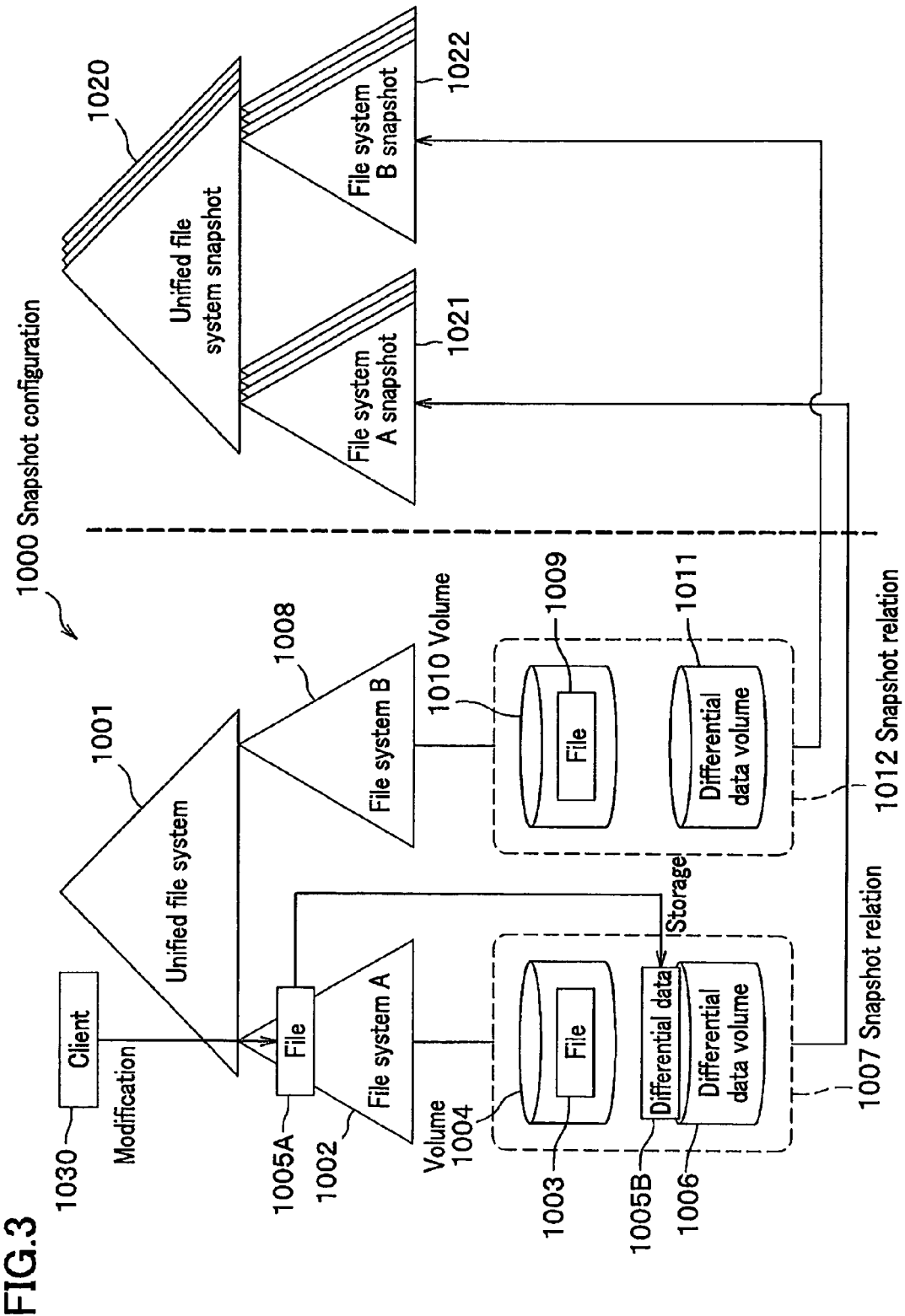
FIG. 3 shows a schematic view representing an example of a snapshot configuration in a unified file system.

FIG. 3 shows a schematic view representing an example of a snapshot configuration 1000 (which may be simply referred to as configuration 1000, hereinafter) in a unified file system 1001. In the configuration 1000, when acquiring a snapshot of the unified file system 1001, the snapshot is created by integrating snapshots of file systems to be unified. That is, a unified file system snapshot 1020 is created by acquiring snapshots 1021, 1022 of respective unified file systems 1002, 1008 and integrating these snapshots (refer to the right side of FIG. 3) as a snapshot of the unified file system 1001.

The unified file system is a file system that is created by unifying two or more file systems into a single virtual (dummy) file system. For example, as will be explained later, a file system A 1002 and a file system B 1008 are unified to create a single dummy unified file system 1001. Files stored under the unified file system 1001 are actually stored in the file system A 1002 or file system B 1008. When a user or a server program accesses a file stored for the unified file system 1001, a file stored for the file system A 1002 or the file system B 1008 is accessed.

The meaning of "a file stored for a file system" or "a file managed by a file system" is the file managed by the file system on a volume which the file is stored in. Furthermore, in a virtual file system such as the unified file system 1001, the meaning of "a file stored for a file system" or "a file managed by a file system" is the file managed by the file system to be unified on a volume which the file is stored in. This meaning is applicable not only to a file system but also to a snapshot.

In the configuration 1000, the unified file system 1001 has the file system A 1002 and the file system B 1008. The file system A 1002 has a volume 1004 which stores a file 1003 for the file system A 1002, and a differential data volume 1006 which stores differential data created when modifying a file for the file system A 1002. The respective two volumes are managed as a snapshot relation 1007. Furthermore, the file system B 1008 has a volume 1010 which stores a file 1009 for the file system B 1008, and a differential data volume 1011 which stores differential data created after modifying a file for the file system B 1008. The respective two volumes are managed as a snapshot relation 1012.

When a user using a client 1030 writes data to a file 1005A (file 1003 which is seen from the user through unified file system 1001) or modifies data stored therein, differential data 1005B created after modification is stored in the differential data volume 1006. The operation of the file system B 1008 is similar to this operation. The snapshots of the respective file systems are created by using the snapshot relation 1007 of the file system A 1002 and the snapshot relation 1012 of the file system B 1008.

On the other hand, the unified file system snapshot 1020, which is a file system snapshot of the unified file system 1001, has a file system A snapshot 1021 and a file system B snapshot 1022 (refer to the right side of FIG. 3).

Furthermore, a plurality of file system snapshots can be created. For example, a file system snapshot is created at 10:00, and another file system snapshot is created at 11:00. In this processing, the unified file system snapshot 1020 is created by unifying snapshots created at respective time points.

For example, when unifying the file system A snapshot 1021 acquired at 10:00 and the file system B snapshot 1022 acquired at the same time point or 10:00, the unified file system snapshot 1020 at 10:00 is created.

Next, the relation between the HSM function and the configuration 1000 will be explained. If a file is migrated from the file system A 1002 to the file system B 1008 by the HSM function, the file is determined to be deleted in the snapshot processing of the file system A 1002. On the other hand, the file is determined to be written in the snapshot processing of the file system B 1008.

The migration of a file between file systems indicates that a file managed by a file system created for a volume, from which the file is migrated, is deleted from the volume. Then, the file is written in a volume, to which the file is migrated, and is managed by a file system created for the volume.

As a result, although a file is not actually modified, the file is determined to be modified after the file migration processing of the HSM function. As a result, redundant data (differential data) is undesirably stored in the differential data volume 1006. On the other hand, the differential data volume 1011 of the file system B 1008 comes to be required, and a large amount of differential data volume comes to be required in the entire structure.

That is, when a file is modified, differential data is actually necessary since the contents of the file are modified. On the other hand, when a file is migrated, only the storage location of the file is changed, and the contents of the file are not changed (edited). Accordingly, when a file is migrated, differential data is not required. If a method to distinguish between the modification of a file and the migration of a file is not implemented, the file server 1404 executes the processing of the migration of a file as a combination of file modifications. That is, the file server 1404 deletes a file for a file system from which the file is migrated as a file modification processing, and writes a file for the file system to which the file is migrated as a file modification processing. As a result, differential data (that is, file 1003 itself) for the file deletion, which is not required in effect, is undesirably stored in the differential data volume 1006 for the file system A 1002, from which the file is migrated. Furthermore, differential data (that is, file 1003 itself) for the file writing, which is not required in effect, is undesirably stored in the differential data volume 1011 for the file system B 1008, to which the file is migrated. Accordingly, this processing is redundant also in the point that the differential data of the same content is undesirably stored in both of these respective differential data volumes.

The manner so far explained in which the differential data is redundantly stored is understood when paying attention to a file system, and such redundant processing is also carried out for a file system snapshot. That is, when the HSM function migrates a file between volumes so as to optimally dispose the file, the snapshot function undesirably determines that the file is deleted/modified, and saves data of the file (differential data) in a differential data volume. As a result, the snapshot function has (save) data of the file in the differential data volume redundantly, which consumes the storage capacity redundantly. The contents of the file are not changed after the file is migrated. So, also in the file system snapshot, it is not fundamentally necessary to manage the migrated file as a modified file. On the other hand, when differential data is redundantly stored in a file system, in conjunction with the processing, the differential data is redundantly saved also in the file system snapshot.

The HSM function does not have the snapshot function. Accordingly, the unified file system 1001 does not provide the snapshot function. The present invention utilizes the snapshot function for the file system A 1002 and file system B 1008 to be unified by the unified file system 1001. The reason is to facilitate changing the configuration and suspending the utilization of the unified file system 1001. For example, when utilizing the unified file system 1001 ends, and respective file systems are used individually, the entire snapshot function has to be discarded once if the unified file system 1001 provides the snapshot.

Figure 4:
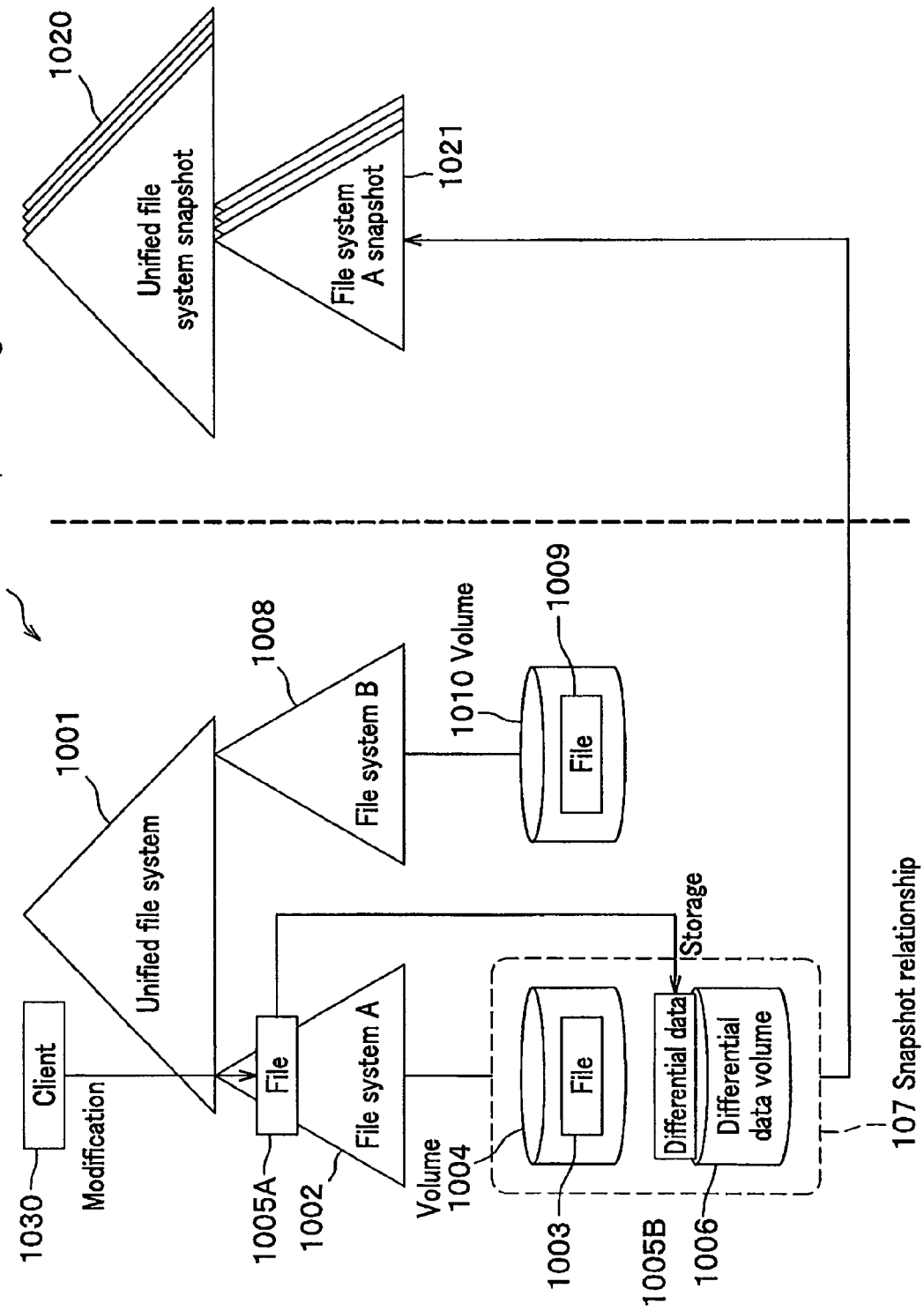
FIG. 4 shows a schematic view representing an example of a snapshot configuration in the unified file system.

FIG. 4 shows a schematic view representing an example of a snapshot configuration 1100 (which may be simply referred to as configuration 1100, hereinafter) in the unified file system 1001 according to the embodiment. In the configuration 1100, a snapshot is created only for the file system A 1002. A snapshot is not acquired for the file system B 1008 (including a case in which the file system B 1008 is not provided with the function of acquiring a snapshot, or a case in which, while the file system B 1008 is not provided with the function of acquiring a snapshot, the file system B 1008 does not acquires a snapshot purposely). Differential data of a file of the file system A 1002 and differential data of a file of the file system B 1008 are stored in the differential data volume 1006 (details of which will be explained later). When a file for the file system B 1008 is not changed, as will be explained later, original data is accessed using a link. Otherwise, by copying a file to a snapshot, a snapshot of the file system B 1008 is created.

In the configuration 1100, the file system A 1002 and the file system B 1008 constitute the unified file system 1001. The file system A 1002 consists of the volume 1004 and the differential data volume 1006. The volume 1004 stores data of the file 1003 for the file system A 1002, and the differential data volume 1006 stores data of the differential data generated when modifying a file for the file system A 1002. The respective two volumes are managed as the snapshot relation 1007. Furthermore, only the volume 1010 which stores the file 1009 of the file system B 1008 constitutes the file system B 1008.

When a user utilizing the client 1030 writes data to the file 1005A (the file 1003 when the user sees through the unified file system 1001) or modifies data stored therein, differential data 1005B generated after modification is stored in the differential data volume 1006. The snapshot of the file system is created using the snapshot relation 1007 of the file system A 1002.

On the other hand, only the file system A snapshot 1021 constitutes the unified file system snapshot 1020 which is a file system snapshot of the unified file system 1001. As will be explained later, the file system A snapshot 1021 stores also snapshot data of the file system B 1008.

Next, the relation between the HSM function and the configuration 1100 will be explained. When a file is migrated from the file system A 1002 to the file system B 1008 by the HSM function, the file is determined to be deleted in the snapshot processing of the file system A 1002. The file system B 1008 does not have a snapshot in the configuration 1100, and there is no effect on the file system B 1008. In the configuration 1100, the file system A snapshot 1021 restores a snapshot of the file system B 1008 by setting a link for the file system A snapshot 1021 before migrating a file.

Next, the time series operation in the configuration 1100 shown in FIG. 4 will be explained in detail referring to FIG. 5 and FIG. 6. Furthermore, the processing of the file server will be explained by employing the configuration 1100 shown in FIG. 4.

Figure 5:
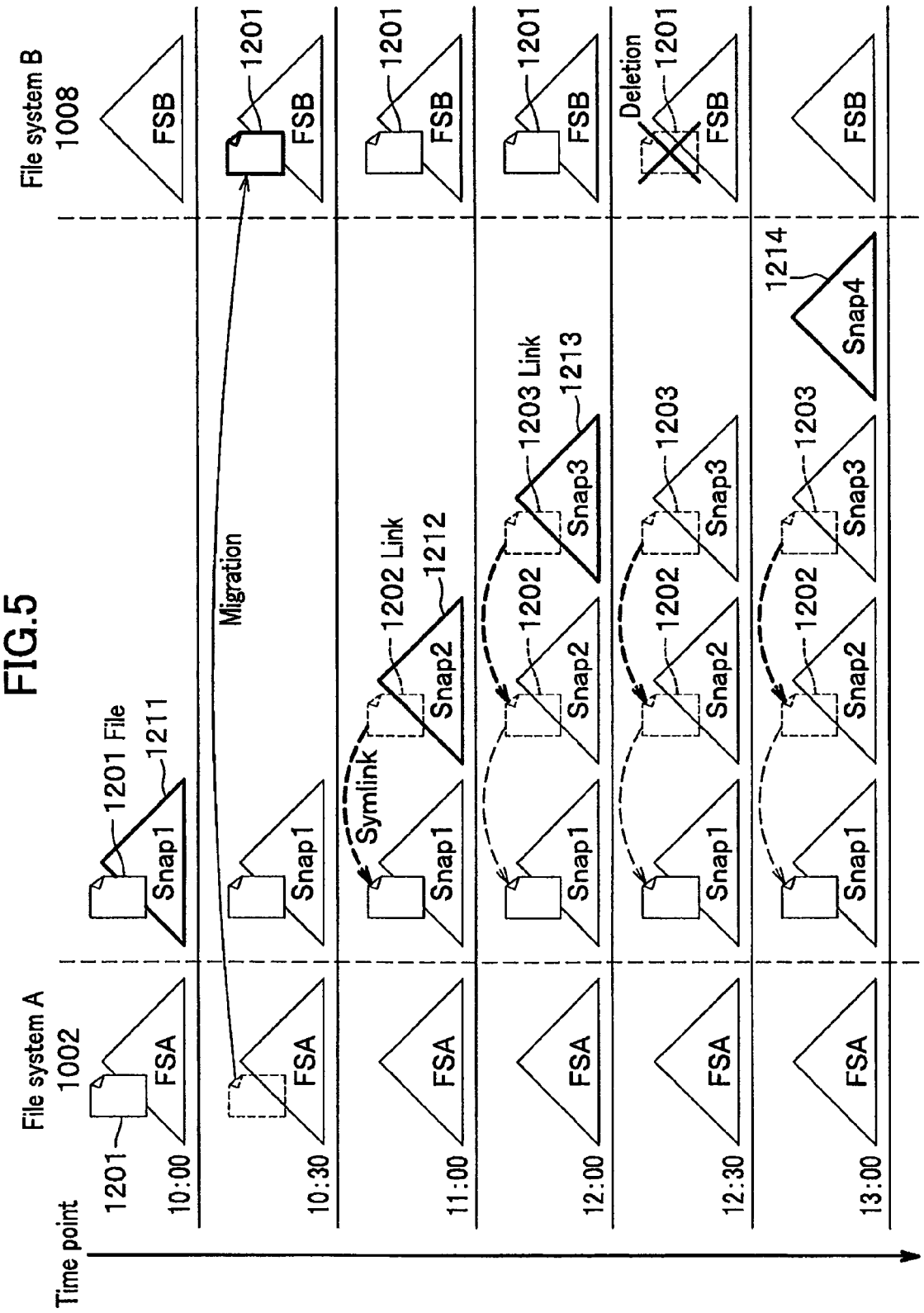
FIG. 5 shows a view to explain the snapshot status for a file system A snapshot at respective time points and the link relation of a migrated file.

FIG. 5 shows a view to explain the snapshot status for the file system A snapshot 1021 at respective time points and the link relation of a migrated file in the configuration 1100 shown in FIG. 4.

FIG. 5 represents the snapshot acquisition by the file system A 1002, file migration from the file system A 1002 to the file system B 1008, and file deletion after the file migration to the file system B 1008, which are represented in time series from a time point of 10:00 to a time point of 13:00. In FIG. 5, FSA represents the file system A 1002, FSB represents the file system B 1008, and Snap 1 (1211) to Snap 4 (1214) represent snapshots of the FSA which are acquired at the respective time points. Hereinafter, the file migration between the file systems and link creation relation will be explained in time series.

(1) 10:00

The snapshot "Snap 1 (1211)" of the file system A 1002 is acquired. At this time point, a file 1201 is stored in the Snap 1 (1211).

(2) 10:30

The file 1201 is migrated from the FSA to the FSB. As a result, the file 1201 is deleted for the FSA, and is created for the FSB.

(3) 11:00

The snapshot "Snap 2 (1212)" of the file system A 1002 is acquired. At this time point, the file 1201 disappears from the Snap 2 (1212), and appears in the Snap 1 (1211). Then, a program of the HSM function sets a link 1202 to the file 1201 of the Snap 1 (1211) from the Snap 2 (1212). As a result, when a client accesses the link 1202 of the Snap 2 (1212), the client automatically accesses the file 1201 of the Snap 1 (1211). It is desirable that the link be a symbolic link (symlink).

(4) 12:00

The snapshot "Snap 3 (1213)" of the file system A 1002 is acquired. In this processing, the file is not migrated. The program of the HSM function sets a link 1203 from the Snap 3 (1213) to the link 1202 of the Snap 2 (1212). As a result, when the client 1030 accesses the link 1203 of the Snap 3 (1213), the link is automatically traced, and the client 1030 accesses the file 1201 of the Snap 1 (1211).

(5) 12:30

The file 1201 is deleted from the file system B 1008.

(6) 13:00

The snapshot "Snap 4 (1214)" of the file system A 1002 is acquired. The file 1201 is deleted at 12:30, and the program of the HSM function does not create a link in the Snap 4 (1214).

In this way, the HSM function sets a link after the HSM function migrates a file to a file system not having a snapshot. Accordingly, the original file can be accessed. Furthermore, after the file is deleted from a file system not having a snapshot, the HSM function does not create a link, so that the snapshot after deletion can be restored.

When the Snap 1 (1211) to Snap 4 (1214) of the FSA are created, their unified file system snapshots are also acquired at respective time points.

Figure 6:
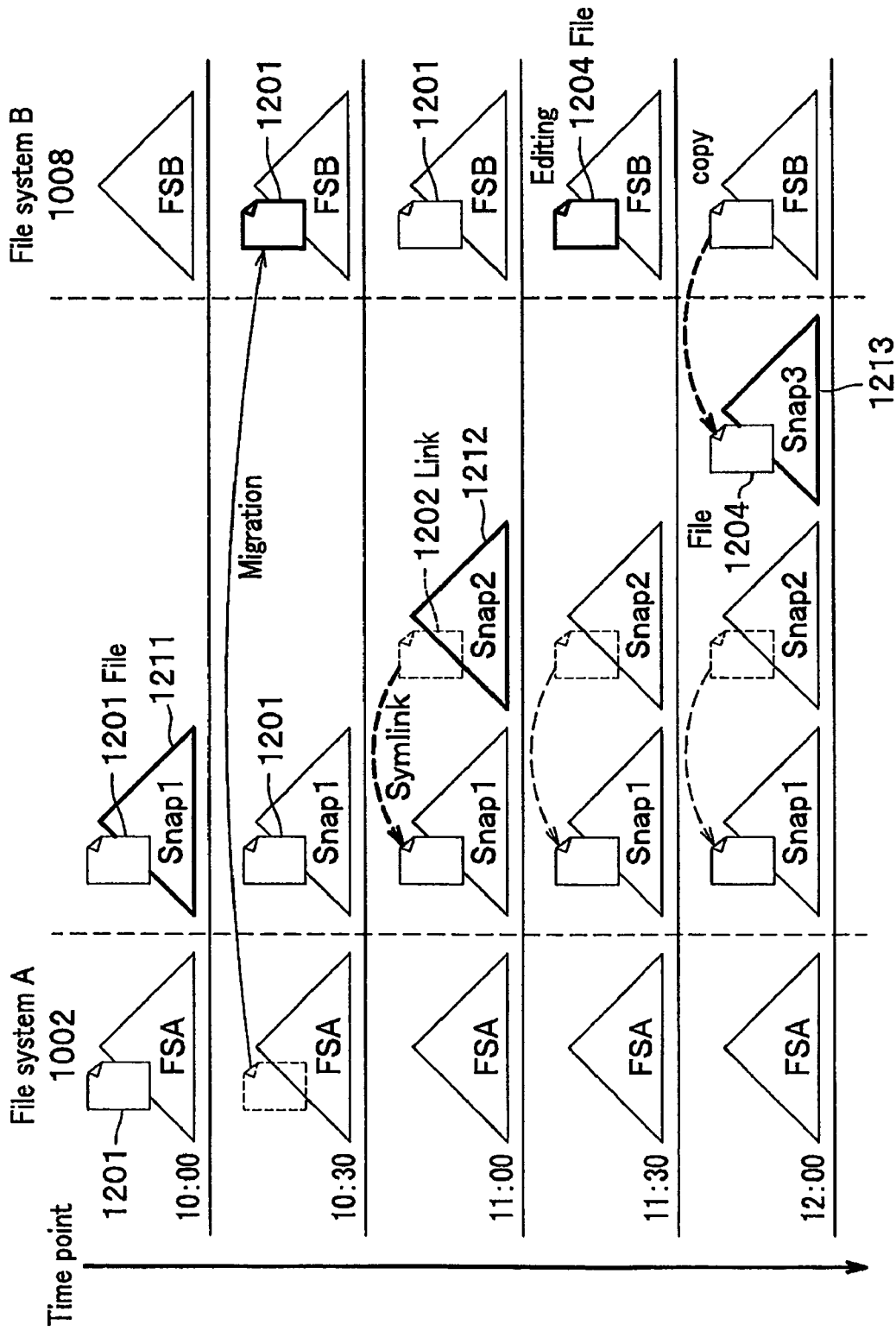
FIG. 6 shows a view to explain the snapshot status for the file system A snapshot at respective time points, the link relation of a migrated file, and file modification and snapshots after migration.

FIG. 6 shows a view to explain the snapshot status for the file system A snapshot 1021 at respective time points, the link relation of a migrated file, and file modification and snapshot after migration in the configuration 1100 shown in FIG. 4.

FIG. 6 represents the snapshot acquisition by the file system A 1002, file migration from the file system A 1002 to the file system B 1008, and snapshot acquisition after a user edits a file of the file system B 1008, which are represented in time series from a time point of 10:00 to a time point of 12:00. In FIG. 6, FSA represents the file system A 1002, FSB represents the file system B 1008, and Snap 1 (1211) to Snap 3 (1213) represent snapshots of the FSA which are acquired at the respective time points. Hereinafter, the file migration between the file systems, link creation relation, file editing after the file migration, and file copy to a snapshot will be explained in time series.

(1) 10:00

The snapshot "Snap 1 (1211)" of the file system A 1002 is acquired. At this time point, the file 1201 is stored in the Snap 1 (1211).

(2) 10:30

The file 1201 is migrated from the FSA to the FSB. As a result, the file 1201 is deleted for the FSA, and is created for the FSB.

(3) 11:00

The snapshot "Snap 2 (1212)" of the file system A 1002 is acquired. At this time point, the file 1201 disappears from the Snap 2 (1212), and appears in the Snap 1 (1211). Then, a program of the HSM function sets the link 1202 from the Snap 2 (1212) to the file 1201 of the Snap 1 (1211). As a result, when a client accesses the link 1202 of the Snap 2 (1212), the client automatically accesses the file 1201 of the Snap 1 (1211). It is desirable that the link be a symbolic link (symlink).

(4) 11:30

A user edits the file 1201 of the file system B 1008 to create a file 1204.

(5) 12:00

The snapshot "Snap 3 (1213)" of the file system A 1002 is acquired. At this time point, the file 1201 has been edited to the file 1204. In this case, when setting a link to the Snap 2 (1212), the link undesirably works as a link to the old file 1201. Accordingly, the snapshot is not in conformity with the unified file system 1001. So, in this processing, the file is copied from the file system B 1008 to the Snap 3 (1213). In this way, the file 1204 which is created after the user edits the file 1201 can be accessed from the snapshot.

In this way, the HSM function sets a link after the HSM function migrates a file to a file system not having a snapshot. Accordingly, the original file can be accessed. Furthermore, when the file is edited on a file system not having a snapshot, a snapshot having a file after editing can be restored by copying the file to the snapshot.

When the Snap 1 (1211) to Snap 3 (1213) for the FSA are created, their unified file system snapshots are also acquired at respective time points.

The explanation of the general outline of the technique of creating a plurality of snapshots and the technique of providing the plural snapshots to a client by the file server 1404 is completed.

Figure 7:
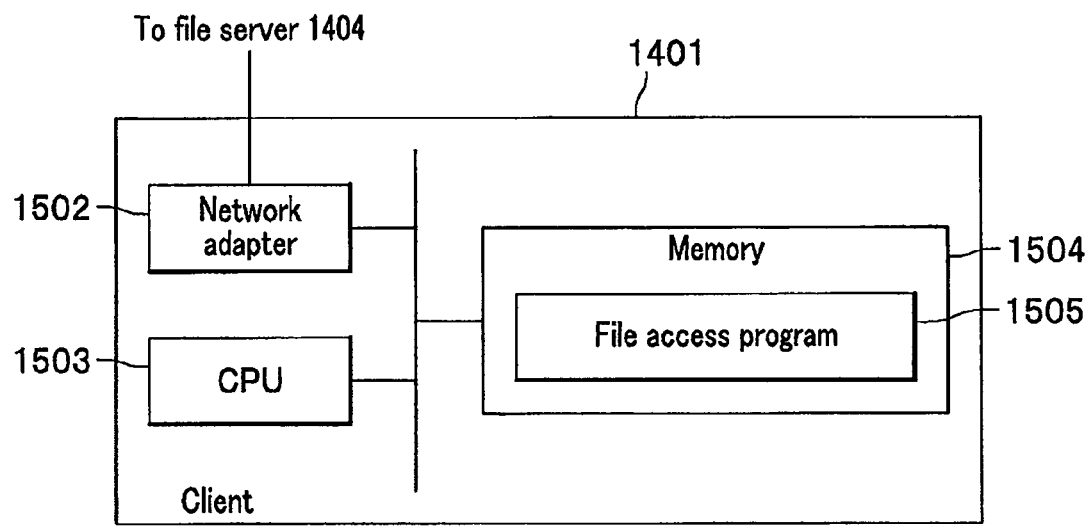
FIG. 7 shows a block diagram representing the internal configuration of a client.

FIG. 7 shows a block diagram representing the internal configuration of the client 1401.

The client 1401 includes a network adapter 1502 to be connected to a LAN, a CPU (Central Processing Unit) 1503, and a memory 1504, which are communicably connected to one another through an internal communication path.

The memory 1504 has a file access program 1505 stored therein which is a program to be executed by the CPU 1503. The file access program 1505 transmits a file access request to the file server 1404 in accordance with an instruction to access a file by a user who utilizes the client 1401. Then, the file access program 1505 receives a file access result from the file server 1404. Finally, the file access program 1505 returns the result to the user of the client 1401 by displaying the result on a display screen etc.

Figure 8:
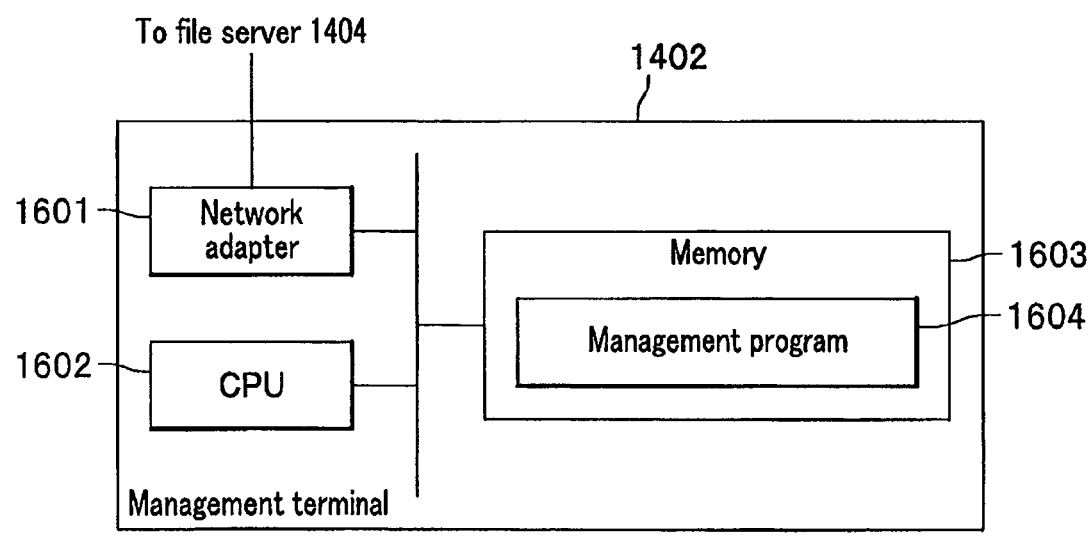
FIG. 8 shows a block diagram representing the internal configuration of a management terminal.

FIG. 8 shows a block diagram representing the internal configuration of the management terminal 1402.

The management terminal 1402 includes a network adapter 1601 to be connected to a LAN, a CPU 1602, and a memory 1603, which are communicably connected by an internal communication path one another.

The memory 1603 has a management program 1604 stored therein which is a program to be executed by the CPU 1602. The management program 1604 is used by a manager who manages the file-sharing system 1400. The management program 1604 transmits a management request such as file system management and user management to the file server 1404 in accordance with an instruction by the manager. Then, the management program 1604 receives an execution result of the management operation from the file server 1404. Finally, the management program 1604 returns the execution result to the manager by displaying the result on a display screen etc.

The file server 1404 may assume the role of the management terminal 1402. Accordingly, the file server 1404 may have part or all of the hardware and software of the management terminal 1402.

Figure 9:
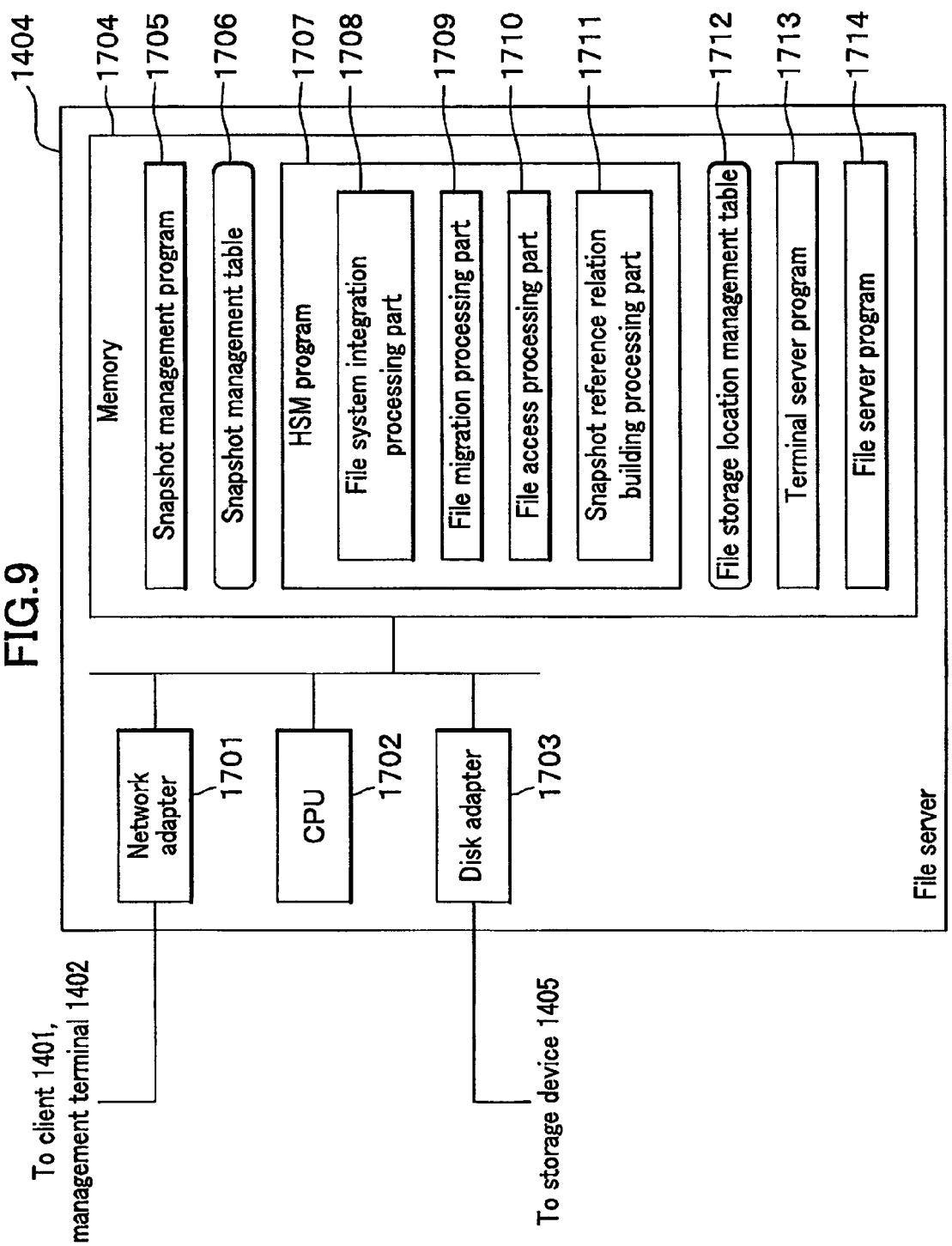
FIG. 9 shows a block diagram representing the internal configuration of a file server.

FIG. 9 shows a block diagram representing the internal configuration of the file server 1404.

The file server 1404 includes a network adapter 1701 to be connected to a LAN, a CPU (Central Processing Unit) 1702, a disk adapter 1703 (which may be referred to as storage I/F (Interface), hereinafter) to be connected to the storage device 1405, and a memory (storage part) 1704, which are communicably connected to one another through an internal communication path.

The memory 1704 has a snapshot management program 1705, an HSM program 1707, a terminal server program 1713, and a file server program 1714 stored therein. Furthermore, the memory 1704 has a snapshot management table (snapshot management information) 1706, and a file storage location management table (file storage location management information) 1712 stored therein.

The snapshot management program 1705 is a program to be executed by the CPU 1702. The snapshot management program 1705 accepts a snapshot acquisition request by a manager, and acquires a file system snapshot. Then, the snapshot management program 1705 manages the snapshot using the snapshot management table 1706. Details of the processing of the snapshot management program 1705 will be described later.

The HSM program 1707 is a program to be executed by the CPU 1702. The HSM program 1707 includes a file system integration processing part 1708, a file migration processing part 1709, a file access processing part 1710, and a snapshot reference relation building processing part 1711. The HSM program 1707 builds a unified file system (which corresponds to the unified file system 1001 shown in FIG. 4) using the file system integration processing part 1708.

Furthermore, the HSM program 1707 migrates a file between unified file systems (which corresponds to the file system A 1002 or the file system B 1008 shown in FIG. 4) using the file migration processing part 1709.

Furthermore, the HSM program 1707 processes a file access request from the client 1401 using the file access processing part 1710. The file access processing part 1710 specifies a file system storing the file by referring to the file storage location management table 1712 to access a file.

Then, the HSM program 1707 builds a snapshot reference relation of the file which is migrated to a file system not having a snapshot using the snapshot reference relation building processing part 1711. Details of the processing of the HSM program 1707 will be described later.

The terminal server program 1713 is a program to be executed by the CPU 1702. The terminal server program 1713 is a terminal emulator which is operated when the manager accesses the file server 1404 using the management program 1604 of the management terminal 1402. The manager connects with the file server 1404 through the terminal server program 1713, and requests the snapshot management program 1705 etc. to perform the management processing. Then, the manager receives the result of the management processing from the snapshot management program 1705 etc., and returns the result to the management terminal 1402.

The file server program 1714 is a program to be executed by the CPU 1702. The file server program 1714 is a server program which is operated when a user requests a file access to the file server 1404 by using the file access program 1505 of the client 1401. The file server program 1714 receives the file access request by the client 1401, and transmits the file access request to the file access processing part 1710 of the HSM program 1707. Then, file server program 1714 receives the result of the file access from the file access processing part 1710, and returns the result to the 1401.

Figure 10:
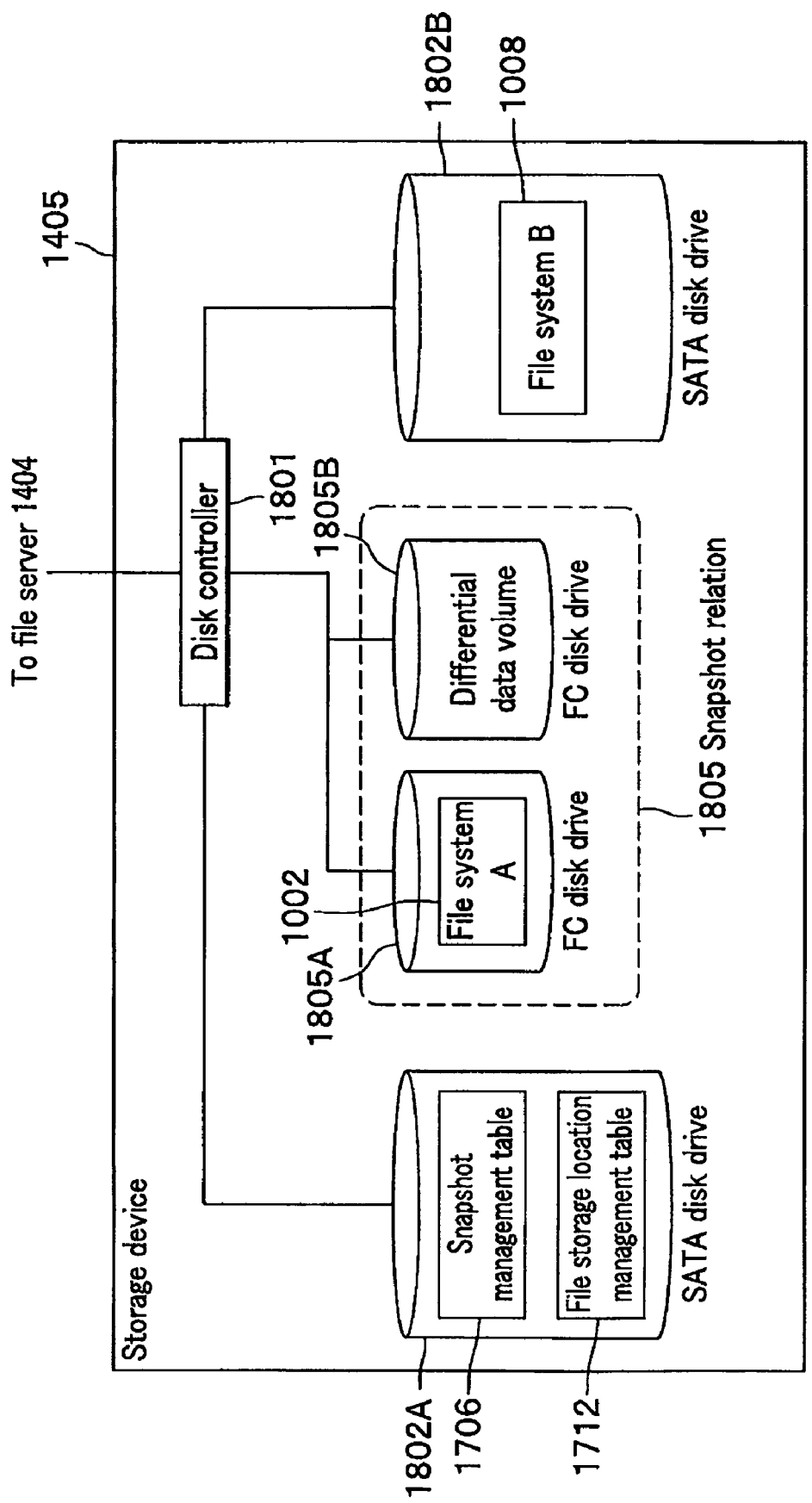
FIG. 10 shows a block diagram representing a storage device.

FIG. 10 shows a block diagram representing the storage device 1405.

The storage device 1405 includes a disk controller 1801, SATA disk drives 1802A, 1802B, and FC disk drives 1805A, 1805B. The SATA disk drives 1802A, 1802B, and FC disk drives 1805A, 1805B may be simply referred to as "disk drives".

The disk controller 1801 processes the SCSI (Small Computer System Interface) protocol which is a disc access protocol, and provides the file server 1404 with a disk access function. When the file server 1404 requests a disk access to the storage device 1405, the disk controller 1801 acquires data from a disk drive, and returns the data to the file server 1404. Furthermore, the disk controller 1801 provides the RAID (Redundant Arrays of Inexpensive Disks) function which makes a disk loaded in the storage device 1405 redundant to improve the reliability of data.

The SATA disk drive 1802A has the snapshot management table 1706 and file storage location management table 1712. The SATA disk drive 1802A has stored therein the same information as that of the snapshot management table 1706 and file storage location management table 1712 which are stored in the memory 1704 of the file server 1404. Information stored in the memory 1704 disappears when the file server 1404 is suspended, while information stored in the SATA disk drive 1802A does not disappear. When the file server 1404 is restarted by some sort of case, information stored in the memory 1704 of the file server 1404 has to be utilized continuously. Accordingly, the information is stored in the SATA disk drive 1802A that can retain data although the power supply is suspended.

The FC disk drive 1805A is a disk in which the file system A 1002 which forms the unified file system is created.

The FC disk drive 1805B is a differential data volume that stores differential data when a user writes a file to the file system A 1002 or modifies the file. These disks build a snapshot relation 1805.

When building the snapshot relation 1805, as shown in FIG. 10, a volume for which the file system A 1002 is created and a differential data volume may be formed for the respective disk drives using the two FC disk drives 1805A, 1805B. Otherwise, these volumes may be formed using a single disk drive or three or more disk drives (disk of any type may be employed).

The SATA disk drive 1802B is a disk in which the file system B 1008 which forms the unified file system is created.

The disk drives explained referring to FIG. 10 are examples, and disk drives other than the FC disk drives and SATA disk drives may be used. Furthermore, an SSD (Solid State Drive), a tape device, and an optical disk, etc. may be used. The HSM function, to which the present invention is applied, optimizes the cost of storage by utilizing the difference of properties and the difference of prices of disk drives. Accordingly, the HSM function is effective when plural different disk drives are used.

FIG. 11 shows a view representing an example of the snapshot management table 1706 stored in the memory 1704 of the file server 1404 and the SATA disk drive 1802A of the storage device 1405.

In the snapshot management table 1706, mount paths 1901, snapshot names 1902, file storage location management table names 1903 indicating names of the file storage location management table 1712, and creation time points 1904 of snapshots are made to correspond to each other to be registered.

The mount path 1901 is a path in which a snapshot acquired at a specific time point is mounted.

The snapshot name 1902 is a name of the snapshot acquired at the specific time point.

The file storage location management table name 1903 is a name of the file storage location management table 1712 which is copied when a snapshot is acquired. The file storage location management table 1712 copied when a snapshot is acquired can be specified using the name.

The creation time point 1904 is a time point when a snapshot is acquired. This time point can be acquired from a timer, not shown, which is installed in the file server 1404 etc.

Figure 12:
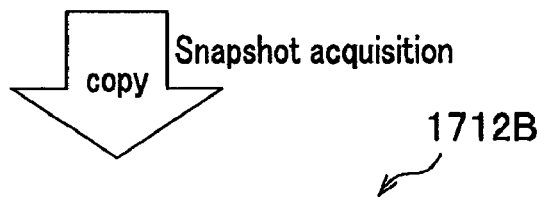
FIG. 12 shows a view representing an example of a file storage location management table.

FIG. 12 shows a view representing an example of the file storage location management table 1712 stored in the memory 1704 of the file server 1404 and the SATA disk drive 1802A of the storage device 1405.

In the file storage location management table 1712, file names 2001, storage location file names 2002, storage location file systems 2003, and modification flags 2004 are made to correspond to each other to be registered.

The file name 2001 is a file name to be provided to a user who utilizes the file server 1404, and is a file name represented in the unified file system 1001.

The storage location file name 2002 is a path (PATH:file path) indicating a location where a file represented by the file name 2001 is actually stored.

The storage location file system 2003 is a name of a file system where a file represented by the file name 2001 is actually stored.

The modification flag 2004 is information indicating that a file is modified when the file represented by the file name 2001 is modified, and a value "0" or a value "1" is registered. When the modification flag 2004 is set to "1", the file is modified. When the modification flag 2004 is set to "0", the file is not modified.

In FIG. 12, two tables 1712A and 1712B are shown as the file storage location management table 1712. The file storage location management table 1712A is a table indicating the file storage location management table 1712 for the "current" unified file system 1001. On the other hand, the file storage location management table 1712B is a table indicating the file storage location management table 1712 for the unified file system "of snapshot" (that is, unified file system snapshot 1020).

In the unified file system snapshot 1020, the storage location file name 2002 is different from that in the unified file system 1001. Accordingly, when acquiring a snapshot, the storage location file name 2002 has to be rewritten by copying the file storage location management table 1712.

When representing an example using the configuration 1100 shown in FIG. 4, the file storage location management table 1712 of the unified file system 1001 is the file storage location management table 1712A. On the other hand, the file storage location management table 1712 of the unified file system snapshot 1020 is the file storage location management table 1712B. In FIG. 12, underlines appended to the paths (snap_1) registered in the storage location file names 2002 are not actually registered in the storage location file names 2002, and these underlines are appended to facilitate understanding of the explanation.

Next, the processing flow in the file-sharing system according to the embodiment will be explained. The processing flow will be explained by taking the configuration 1100 shown in FIG. 4 for example.

Figure 13:
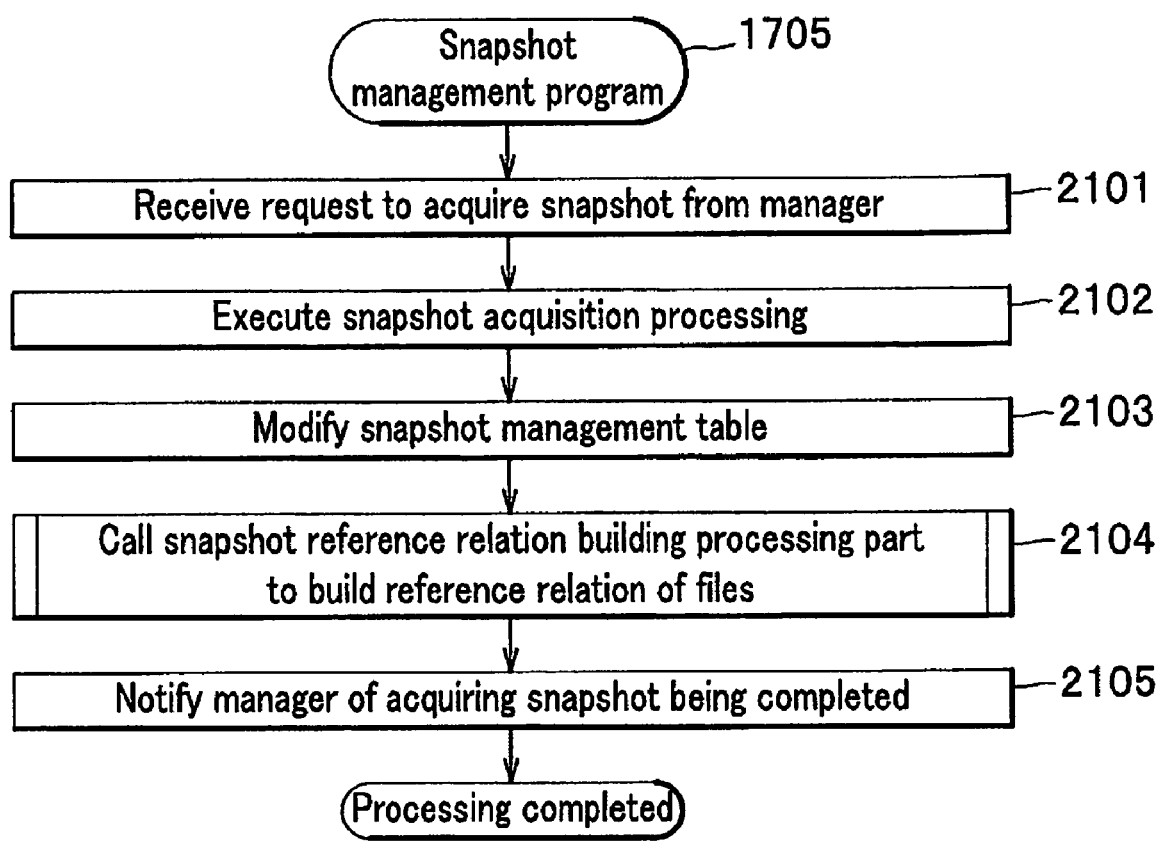
FIG. 13 shows a flow chart indicating an example of processing of a snapshot management program.

FIG. 13 shows a flow chart indicating an example of processing performed when the snapshot management program 1705 of the file server 1404 is executed. This processing is executed by the CPU 1702 that reads in the snapshot management program 1705 of the file server 1404. To facilitate understanding of the explanation, the processing will be explained by paying attention to the snapshot management program 1705.

Firstly, the snapshot management program 1705 receives a request to acquire a snapshot of the unified file system from a manager (step 2101). The manager connects with the file server 1404 by using the management program 1604 of the management terminal 1402, and gives an instruction to acquire a snapshot through the terminal server program 1713. In this processing, the snapshot reference relation building processing part 1711 receives a mount path and a snapshot name of a snapshot from the manager.

Next, the snapshot management program 1705 executes the snapshot acquisition processing to acquire snapshots for file systems for which snapshots can be acquired and which are in the file systems creating the unified file system (step 2102). For example, in the case of the configuration 1100 shown in FIG. 4, the snapshot of the file system A 1002 is acquired.

Next, the snapshot management program 1705 adds a new record to the snapshot management table 1706 to modify the snapshot management table 1706 (step 2103). In this processing, the snapshot management program 1705 records a path to mount thus acquired snapshot to the mount path 1901. Furthermore, the snapshot management program 1705 records a snapshot name specified by the manager when acquiring a snapshot to the snapshot name 1902. Moreover, the snapshot management program 1705 records the name of the file storage location management table 1712 which is copied when acquiring a snapshot to the file storage location management table name 1903. Then, the snapshot management program 1705 records a time point when a snapshot is acquired as the creation time point 1904.

Next, the snapshot management program 1705 calls the snapshot reference relation building processing part 1711 to build a reference relation of files between snapshots (step 2104). Details of the snapshot reference relation building processing part 1711 will be described later.

Finally, the snapshot management program 1705 notifies the manager of acquiring a snapshot being completed (step 2105), and displays the information on a display screen in the management terminal 1402 to complete the processing.

Figure 14:
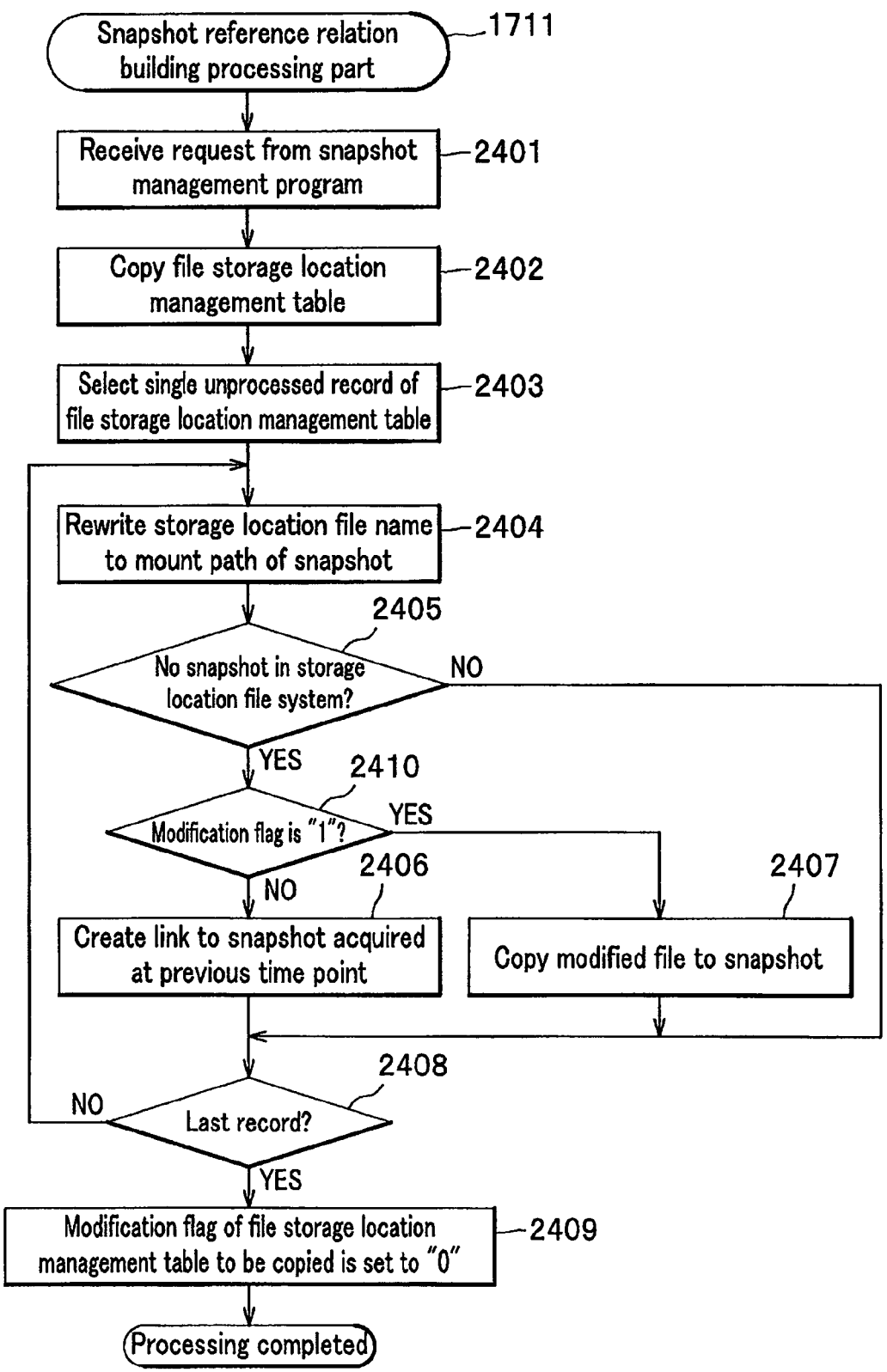
FIG. 14 shows a flow chart indicating an example of processing of a snapshot reference relation building processing part.

FIG. 14 shows a flow chart indicating an example of processing which is performed when the snapshot reference relation building processing part 1711 in the HSM program 1707 of the file server 1404 is executed by the CPU 1702.

Firstly, the snapshot reference relation building processing part 1711 receives a request or a request to build reference relation for a file from the snapshot management program 1705 (step 2401). In this processing, the snapshot reference relation building processing part 1711 receives a mount path and a snapshot name of a snapshot from the snapshot management program 1705.

Next, the snapshot reference relation building processing part 1711 copies the "current" file storage location management table 1712 (file storage location management table 1712A shown in FIG. 12) and stores the copied "current" file storage location management table 1712 in the memory 1704 and SATA disk drive 1802A (step 2402). In this way, the file storage location management table 1712B shown FIG. 12 is formed. In this processing, the snapshot reference relation building processing part 1711 forms the name of the file storage location management table 1712 using a snapshot name. For example, when the snapshot name is "snap_1", the snapshot reference relation building processing part 1711 names the file storage location management table 1712 "snap_1_store" using the snapshot name as the prefix. The manner of naming does not restrict the present invention. The name is registered in the file storage location management table name 1903.

Next, the snapshot reference relation building processing part 1711 selects a single unprocessed record from among records of the copied file storage location management table 1712B (step 2403).

Next, the snapshot reference relation building processing part 1711 rewrites the storage location file name 2002 of the record to a mount path of a snapshot (step 2404). The mount path to be rewritten is the path name which is received by the snapshot reference relation building processing part 1711 from the snapshot management program 1705 in step 2401. In this processing, the snapshot reference relation building processing part 1711 takes out parts to be rewritten from the storage location file name 2002 and file name 2001. This processing is performed by extracting parts of the file name 2001 from the storage location file name 2002.

For example, in the case of the file storage location management table 1712A shown in FIG. 12, the file names 2001 are "/File1" and "/File2", and the storage location file names 2002 are "/DIR1/FILE1" and "/DIR2/FILE2". Accordingly, "/DIR1" and "/DIR2" are parts which should be rewritten. Then, in the file storage location management table 1712B, when the mount path of the snapshot is the "/snap_1", the mount path parts "/DIR1" and "/DIR2" of the storage location file names 2002 are rewritten to the "/snap_1" (refer to underlined parts).

Next, the snapshot reference relation building processing part 1711 checks the storage location file system 2003, and judges whether or not there is a snapshot in a file system for which the file is to be stored, that is, whether or not the file is stored in a file system not having a snapshot (step 2405). For example, in the example shown in FIG. 4, the file stored in the file system B 1008 (FSB) is judged to be YES in step 2405.

If there is a snapshot in a file system for which the file is to be stored, that is, the file is stored for a file system having a snapshot (step 2405: NO), the snapshot reference relation building processing part 1711 checks whether or not the record is the last record of the file storage location management table 1712B (step 2408). If the record is the last record (step 2408: YES), the modification flag 2004 of the file storage location management table 1712A to be copied is set to "0" (step 2409), and the processing is completed. When the processing is completing, the snapshot reference relation building processing part 1711 returns the name of the file storage location management table 1712B to the snapshot management program 1705. On the other hand, if the record is not the last record (step 2408: NO), the processing is returned to step 2404, and processing for other unprocessed records is repeated.

On the other hand, if there is not a snapshot for a file system for which the file is to be stored, that is, the file is stored for a file system not having a snapshot (step 2405: YES), the snapshot reference relation building processing part 1711 checks the modification flag 2004 of the record, and judges whether or not the file is modified, that is, whether or not the modification flag is "1" (step 2410).

If the file is not modified, that is, the modification flag 2004 is not "1" (step 2410: NO), the modification flag 2004 is "0", and the snapshot reference relation building processing part 1711 creates a link to a snapshot acquired at a previous time point (step 2406). For example, when the snapshot (snap_2) is acquired at "11:00" this time, and the snapshot (snap_1) is acquired at "10:00" last time, a link is created to a file of the snap_1.

A file which is deleted from the unified file system is deleted also from the file storage location management table 1712B. Accordingly, a link of the deleted file is not created. Hereinafter, the processing from step 2408 is similar to that which has been described above.

A file which is not modified includes a file which was once modified, and has not been modified during a time period until a snapshot is acquired at least two times or more.

On the other hand, if the modification flag 2004 is determined to be "1" (modified) in step 2410 (step 2410: YES), the snapshot reference relation building processing part 1711 copies a modified file to a snapshot from a file system not having a snapshot (step 2407). For example, in the configuration 1100 shown in FIG. 4, if the snapshot (snap_2) is acquired at "11:00", a modified file in the FSB not having a snapshot is copied to the snap_2. In this way, a file at a time point when a snapshot is acquired is recorded. Hereinafter, the processing from step 2408 is similar to that which has been described above.

The processing in step 2410 may be applied not only to a modified file but also to a file which is newly created in a file system not having a snapshot exceptionally. That is, when a file is newly created, the file is not modified. On the other hand, when the modification flag 2004 is set to "1" directly after the file is newly created, and a snapshot is acquired after the file is newly created, the newly created file may be copied to the snapshot.

As described above, the snapshot reference relation building processing part 1711 copies the file storage location management table 1712 at a time point when a snapshot is acquired, and forms the file storage location management table 1712 dedicated for a snapshot to be acquired. Then, the snapshot reference relation building processing part 1711 rewrites the storage location file name 2002, in which a location where a file is stored is recorded, to a mount path of a snapshot. Then, the snapshot reference relation building processing part 1711 judges whether or not a file system for which a file is stored has a snapshot. Then, if the file system does not have a snapshot, a file at a time point when a snapshot is acquired is set accessible by employing a link or a file copy.

When the file copied to a snapshot in step 2407 has not been modified during a time period until the next snapshot is acquired, and the snapshot is acquired, a link to the file copied to the snapshot is created in step 2406. Furthermore, when the file is deleted, although a snapshot is acquired, neither a copy nor a link is performed to the snapshot. In the file storage location management table 1712, the file information is deleted at a time point when the file is deleted. Although the file storage location management table 1712 is copied (step 2402), a storage location file name cannot be rewritten to a mount path of a snapshot (step 2404).

In this processing, although part of file systems creating the unified file system does not have the snapshot function, the user can utilize a snapshot of the unified file system.

Figure 15:
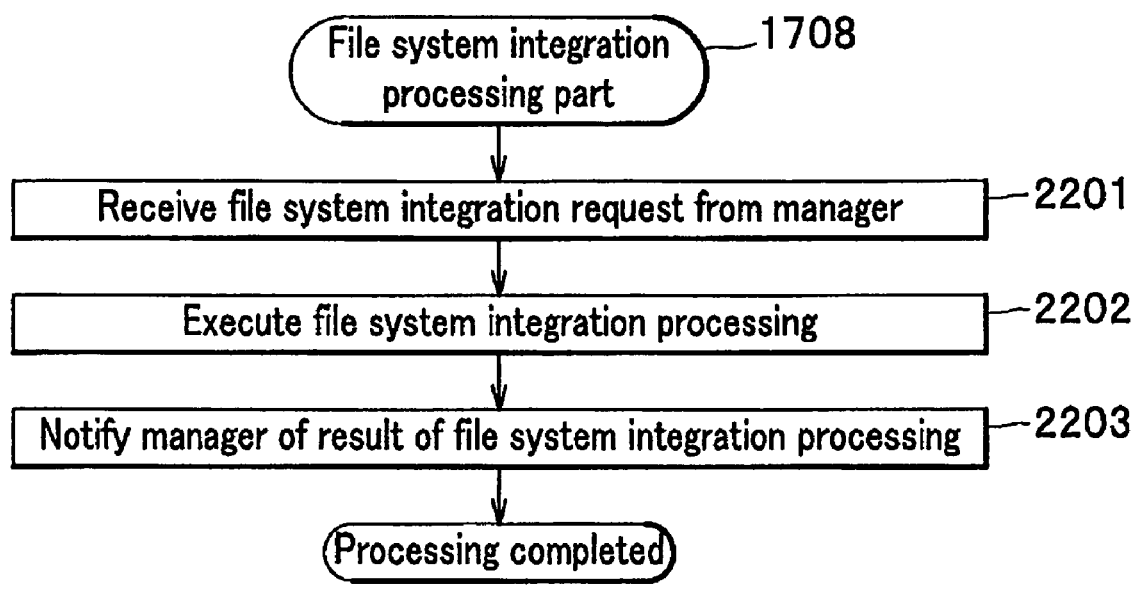
FIG. 15 shows a flow chart indicating an example of processing of a file system integration processing part.

FIG. 15 shows a flow chart indicating an example of processing which is performed when the file system integration processing part 1708 in the HSM program 1707 of the file server 1404 is executed by the CPU 1702.

Firstly, the file system integration processing part 1708 of the HSM program 1707 receives a request to create a unified file system, or a request to integrate file systems from a manager (step 2201). The manager connects with the file server 1404 using the management program 1604 of the management terminal 1402, and gives an instruction to integrate file systems through the terminal server program 1713.

In this processing, the file system integration processing part 1708 receives a mount path of a file system to be integrated to the unified file system 1001. For example, in the case of the configuration 1100 shown in FIG. 4, the file system integration processing part 1708 receives a mount path of the file system A 1002 and a mount path of the file system B 1008. When integrating the file system A snapshot 1021 so as to create the unified file system snapshot 1020, the file system integration processing part 1708 receives a mount path of the file system A snapshot 1021.

Next, the file system integration processing part 1708 executes file system integration processing to integrate file systems specified by the manager in step 2201 (step 2202). In this processing, the file system integration processing part 1708 integrates file systems by referring to the storage location file name 2002 and storage location file system 2003 of the file storage location management table 1712.

For example, a case is considered in which the file system integration processing part 1708 creates the unified file system 1001 of the configuration 1100 in FIG. 4 using the file storage location management table 1712A. The file system integration processing part 1708 receives the "/DIR1" and "/DIR2" (mount paths of file systems) from a manager. Then, the file system integration processing part 1708 recognizes that the file name 2001 is the "/FILE1" and the storage location file name 2002 is "/DIR/FILE1" in the file storage location management table 1712A. Then, the file system integration processing part 1708 confirms a storage path of a file using a mount path sent from the manager. Then, the file system integration processing part 1708 creates the unified file system 1001 so that the "/FILE1" exists which is written in the file name 2001.

Finally, the file system integration processing part 1708 notifies the manager of the result of the file system integration processing (step 2203), and displays the result on a display screen in the management terminal 1402, and completes the processing.

Figure 16:
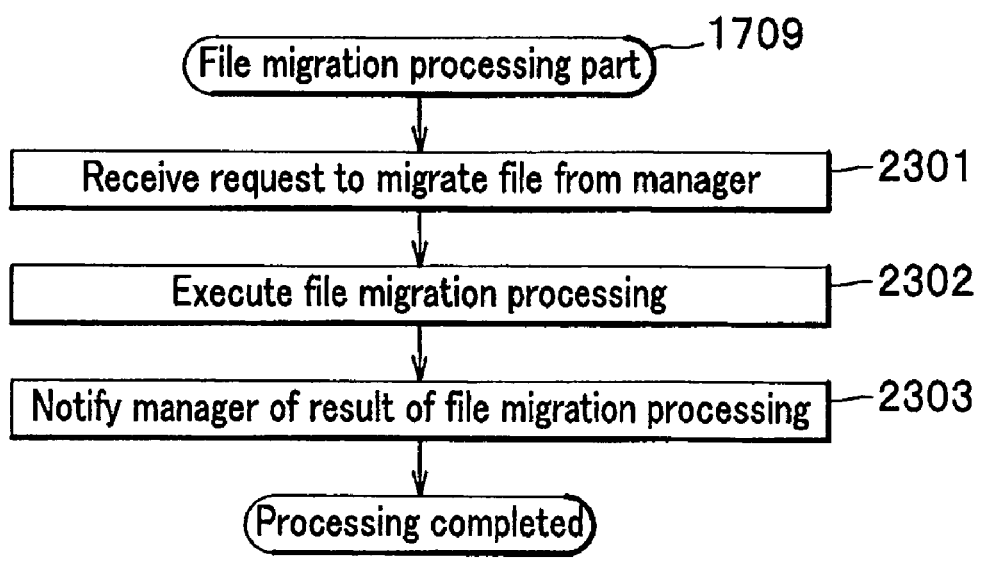
FIG. 16 shows a flow chart indicating an example of processing of a file migration processing part.

FIG. 16 shows a flow chart indicating an example of processing which is performed when the file migration processing part 1709 in the HSM program 1707 of the file server 1404 is executed by the CPU 1702.

Firstly, the file migration processing part 1709 receives a request to migrate a file from a manager (step 2301). The manager connects with the file server 1404 using the management program 1604 of the management terminal 1402, and gives an instruction to migrate a file through the terminal server program 1713.

In this processing, the file migration processing part 1709 receives a file name to be migrated and a file system name to which the file is to be migrated. For example, if files shown in FIG. 12 are stored as those in the file storage location management table 1712A in the configuration 1100 shown in FIG. 4, the file migration processing part 1709 accepts the instruction to migrate a file in the form of options of the "/FILE1" and "FSB" from the manager.

Next, the file migration processing part 1709 executes file migration processing to migrate a file between file systems (step 2302). For example, in the case of the above-described example, the file migration processing part 1709 migrates the file "/FILE1" to the file system B 1008, and rewrites the storage location file name 2002 of the file storage location management table 1712A to "/DIR2/FILE1", and rewrites the storage location file system 2003 to the "FSB".

Finally, the file migration processing part 1709 notifies the manager of the result of the file migration processing (step 2303), and displays the result on a display screen in the management terminal 1402, and completes the processing.

Figure 17:
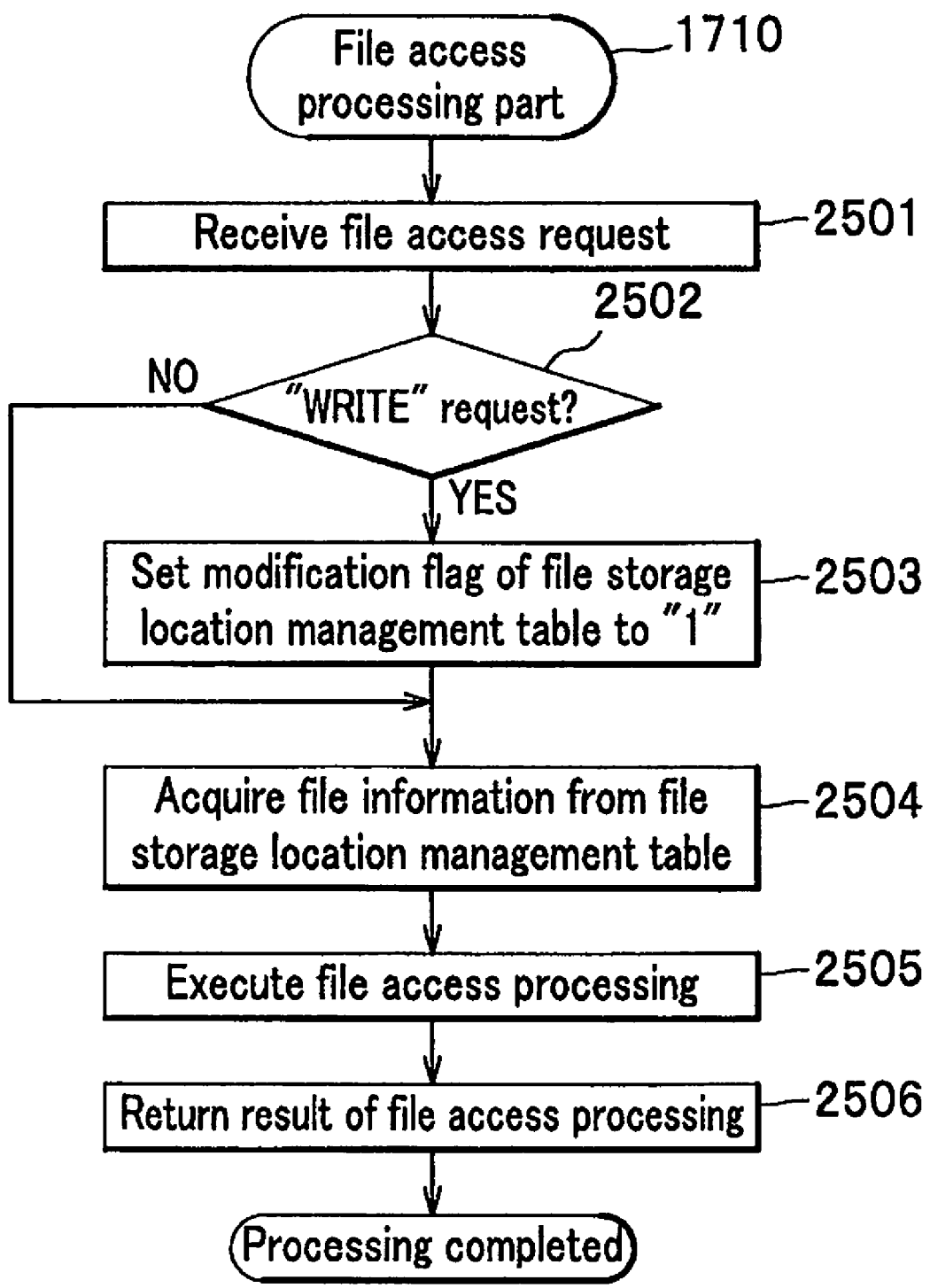
FIG. 17 shows a flow chart indicating an example of processing of a file access processing part.

FIG. 17 shows a flow chart indicating an example of processing which is performed when the file access processing part 1710 in the HSM program 1707 of the file server 1404 is executed by the CPU 1702.

Firstly, the file access processing part 1710 receives a file access request from the file server program 1714 (step 2501). The file server program 1714 accepts the file access request from the file access program 1505 of the client 1401, and requests a file access to the file access processing part 1710 in accordance with the request.

In this case, file use declaration processing "OPEN", file write processing "WRITE", file read processing "READ", and file use completion declaration processing "CLOSE", etc. correspond to the file access.

Next, the file access processing part 1710 judges whether or not the file access request is the "WRITE" request (step 2502).

If the file access request is the "WRITE" request (step 2502: YES), the file access processing part 1710 sets the modification flag 2004 of the file storage location management table 1712 to "1" (step 2503). In this way, the snapshot reference relation building processing part 1711 can judge whether or not a file is modified in step 2410 (refer to FIG. 14). In this processing, the write processing is explained as an example in step 2502 and step 2503. On the other hand, any processing (for example, file attribution setting (SETATTR) processing) in which a file is modified may be employed, and processing which can be judged by the file access processing part 1710 in step 2502 may be employed.

On the other hand, if the file access request is not the "WRITE" request (step 2502: NO), the file access processing part 1710 performs no setting, and continues processing after step 2504.

Next, the file access processing part 1710 acquires file information from the file storage location management table 1712 (step 2504). For example, if the file access request of the client 1401 is an access to the "FILE1" in the file storage location management table 1712A shown in FIG. 12, the file access processing part 1710 acquires a record (file information) in which the "/FILE1" is recorded in the file name 2001.

Next, the file access processing part 1710 executes file access processing using the record acquired in step 2504 (step 2505). For example, in the former example, the file access processing part 1710 acquires a file path in which a file is actually stored using the storage location file name 2002. Then, the file access processing part 1710 performs the file access to the file path.

Finally, the file access processing part 1710 returns (notifies) the result of the file access processing executed in step 2505 to the file server program 1714 (step 2506), and displays the result on a display screen in the client 1401, and completes the processing. The result may be displayed on a display screen in the management terminal 1402.

The file information acquired in step 2504 includes file information of the file storage location management table 1712 (1712B) which is copied in step 2402. Accordingly, when the file access processing is executed in step 2505, a file access is performed to a file path referring to a snapshot. That is, a file access for a file stored in a snapshot can be realized.

In above-described embodiment, in the case of creating a snapshot of a unified file system which integrates a plurality of file systems, although there are file systems which are not provided with the snapshot function in the file systems creating the unified file system, a snapshot of the unified file system can be created. As a result, when building a file-sharing system, it is not necessary to prepare a differential data volume for all the file systems, and the differential data volume can be omitted, which can effectively reduce the bit cost.

The present invention is effective when all or some of the file systems creating the unified file system are of the log structured file system. In the case of the log structured file system, the file server writes write data attached to a write request from a client to a region of a volume which is not allocated for a file, and returns a write completion response to the client. This operation is similarly performed when a pre-determined file is modified, and both data before modification and data after modification (that is, write data) are stored in the volume directly after the write completion.

Accordingly, in the case of the log structured file system, the file server has conversion information including an address entry indicating a region of a volume in which the latest data is stored for respective plural files stored in the file system. When data after modification is stored by the write request, the conversion information modifies an address entry which is related to a file to be written by the write request to a region where data after modification is stored. In this way, when the file server receives a read request, the latest data can be returned by specifying a region of data to be read based on the conversion information. The file server is of the log structured file system. So, processing to specify unnecessary data before modification to release the specified region may be executed.

The snapshot function in the log structured file system duplicates the conversion information at a time point when a snapshot is created, and realizes processing for a read request or a write request to the snapshot by referring to the duplicated conversion information. It becomes possible to provide a snapshot of preferable capacity efficiency in a unified file system including the log structured file system by combining the method and above-described technique. That is, in a snapshot of the log structured file system, the volume capacity to store the log structured file system can be reduced.

Second Embodiment

In the second embodiment, the snapshot of the file system B 1008 in the configuration 1100 shown in FIG. 4 is restored by referring to an entity stored in the file system B 1008 without using a link or a copy. When compared with the first embodiment, the differential data volume 1006 does not have to be used, and the storage cost can be reduced more efficiently.

FIG. 18 shows a view representing an example of the file storage location management table 1712B in the second embodiment. Since a link or a copy is not used in the file system snapshot, it is not necessary to judge whether or not a file is modified. Accordingly, when compared with the file storage location management table 1712B in the first embodiment, there is no modification flag 2004 (refer to FIG. 18).

In the file storage location management table 1712B in the second embodiment, of files represented by file paths recorded in the storage location file name 2002, files migrated to the file system B 1008 (FSB) are so recorded as to directly indicate the files of the file system B 1008. Furthermore, for a case in which the files for the file system B 1008 are rewritten, special file paths are recorded in the storage location file name 2002.

For example, when the mount path of the file system B 1008 is the "/DIR2", the storage location file name 2002 of the "/File2" stored in the file system B 1008 is the "/DIR2/FILE2" (refer to underlined portion). Accordingly, a file itself stored in the file system B 1008 is indicated. On the other hand, underlines appended to the file paths (DIR2 etc.) in FIG. 18 are not registered in the storage location file name 2002, and are appended to facilitate understanding of the explanation.

There is a case in which the user rewrites a file for the file system B 1008. In this case, there is brought about an inconsistency with a file at a time point when a snapshot is acquired. Accordingly, when the user of the client 1401 rewrites the file, the file access processing part 1710 copies the file with another name, and records the name in the storage location file name 2002.

In the example shown in FIG. 18, if the user rewrites a file of the file system B 1008 or "/FILE3", the file is copied as "/FILE3_old_1", and the storage location file name 2002 is so recorded as to indicate the file ("/DIR2/FILE3_old_1").

As described above, a snapshot of a file system which is not provided with the snapshot function indicates a file itself stored in the file system, and can create the unified file system snapshot 1020.

Figure 19:
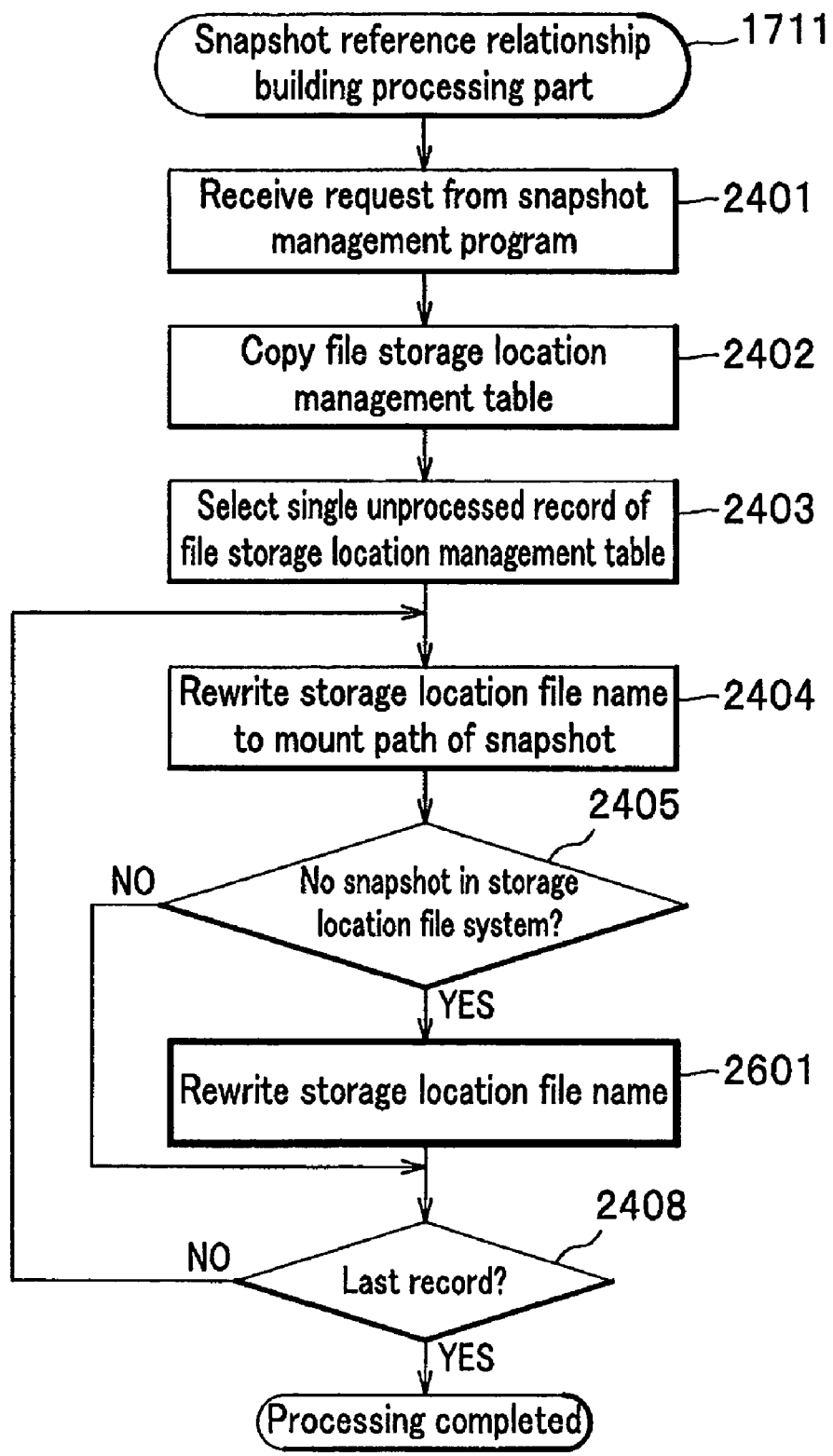
FIG. 19 shows a flow chart indicating an example of processing of the snapshot reference relation building processing part of the second embodiment.

FIG. 19 shows a flow chart indicating an example of processing in the second embodiment which is performed when the snapshot reference relation building processing part 1711 in the HSM program 1707 of the file server 1404 is executed by the CPU 1702. The same reference numerals are appended to processings which overlap with the processings of the snapshot reference relation building processing part 1711 in the first embodiment (refer to FIG. 14), and the explanation for the processings is omitted.

In the second embodiment, a link or a copy is not created in a snapshot. Accordingly, the snapshot reference relation building processing part 1711 does not have to perform the processing to confirm whether or not a file is modified (step 2410), processing to create a link (step 2406), and processing to create a copy (step 2407).

If there is no snapshot in the storage location file system for a file (step 2405: YES), the snapshot reference relation building processing part 1711 rewrites the storage location file name 2002 of the file storage location management table 1712B to a mount path of a file system for which the file itself is stored (step 2601). As in the above, the manner of rewriting the storage location file name 2002 by the snapshot reference relation building processing part 1711 is described by referring to FIG. 18.

Then, the snapshot reference relation building processing part 1711 checks whether or not the record selected in step 2403 is the last record of the file storage location management table 1712B (step 2408). If the record is the last record (step 2408: YES), the processing is completed.

Figure 20:
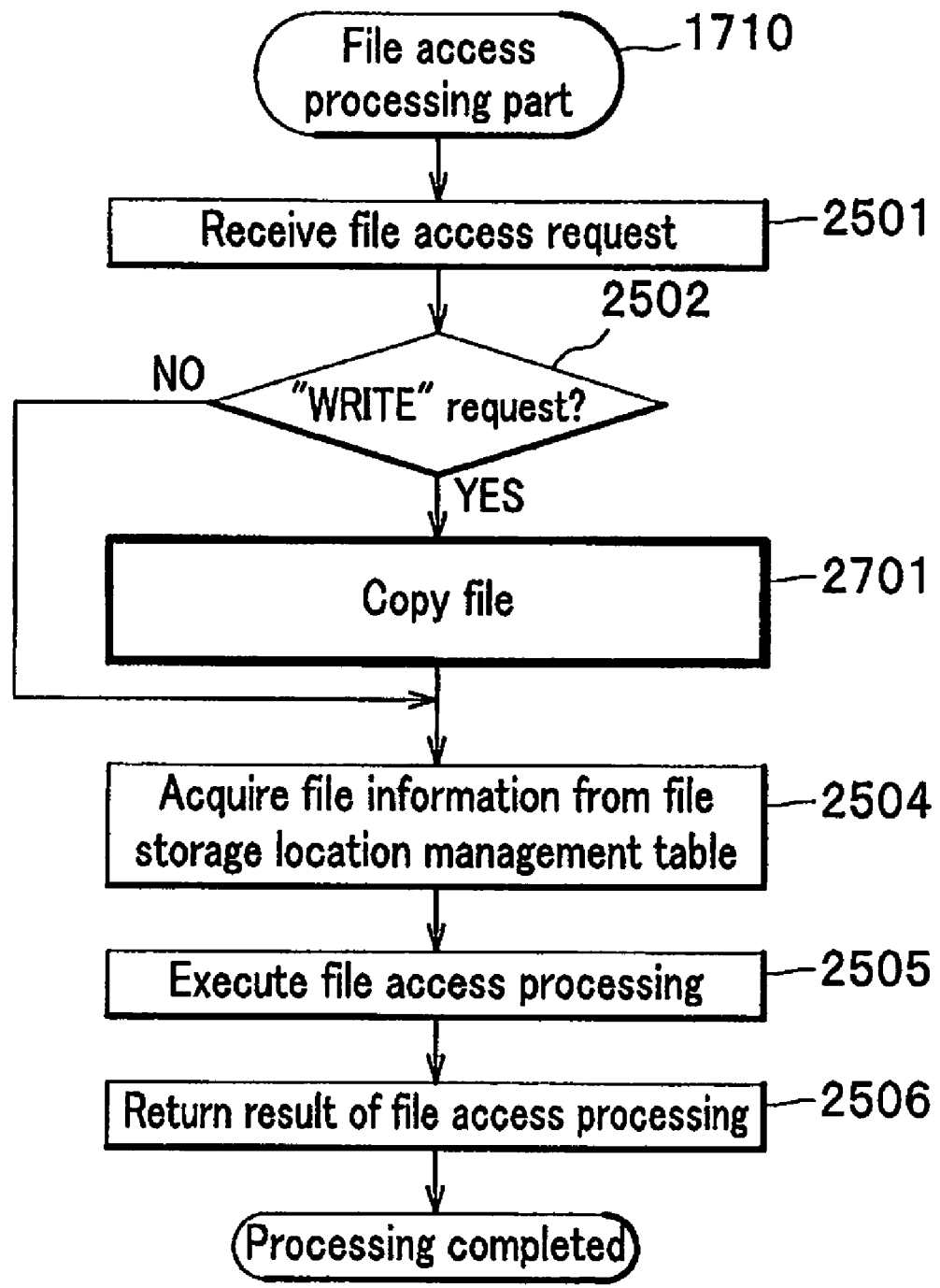
FIG. 20 shows a flow chart indicating an example of processing of the file access processing part of the second embodiment.

FIG. 20 shows a flow chart indicating an example of processing in the second embodiment which is performed when the file access processing part 1710 is executed by the CPU 1702. The same reference numerals are appended to processings which overlap with the processings of the file access processing part 1710 in the first embodiment (refer to FIG. 17), and the explanation for the processings is omitted.

Being different from the first embodiment, in the second embodiment, the current file is copied with another name (step 2701) when there is a write request (step 2502: YES). As indicated in the case of the file storage location management table 1712B shown in FIG. 18, when the user rewrites "/DIR2/FILE3", the file access processing part 1710 copies the file as the "/DIR2/FILE3_old_1". Then, the file access processing part 1710 rewrites the storage location file name 2002 to the "/DIR2/FILE3_old_1". In this processing, the file access processing part 1710 similarly rewrites all the file storage location management table 1712B which was acquired in the past.

In the second embodiment which has been described above, a link or a copy does not have to be written in the file system A snapshot 1021. As a result, it becomes possible to reduce the consumption of the differential data volume.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. A file-sharing system comprising:
a storage device that has one or more volumes; and
a file server that manages files stored in the volumes by using one or more file systems created for the volumes, a unified file system which virtually integrates the file systems, and snapshots of at least one of the file systems which are acquired at one or more time points,
wherein the storage device and the file server are communicably coupled to each other, and
wherein the file server comprises:
a memory that stores snapshot management information which includes mount paths of the snapshots, and represents the snapshots acquired at respective time points, and file storage location management information which includes file paths of the files, and represents storage locations of the files when the unified file system manages the files; and
a processor that executes a snapshot management information modification control for acquiring a snapshot for a file system having the snapshot when receiving a snapshot acquisition request including a mount path of the snapshot from a computer, and modifying the snapshot management information by using the acquired snapshot, a file rewrite control for copying the file storage location management information at a time point when the snapshot is acquired, and rewriting file paths of files included in the copied file storage location management information by using a mount path of the acquired snapshot, and a file access control for performing a file access to the file managed by the acquired snapshot when receiving a file access request from a computer to the rewritten file which is stored in a volume for which a file system not having a snapshot is created.

2. A file-sharing system according to claim 1,
wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is not modified during a time period from a time point when the file is migrated to a time point when a second snapshot is acquired, and wherein the processor of the file server executes the snapshot management information modification control for acquiring the second snapshot when receiving the snapshot acquisition request from the computer with the file kept unmodified, and modifying the snapshot management information by using the acquired second snapshot, the file rewrite control for copying the file storage location management information at a time point when the second snapshot is acquired, and performing the rewriting for the unmodified file, and a link management control for creating a link to a file which is managed by the first snapshot in a volume for which a file system having the second snapshot is created, and managing the created link by using the second snapshot.

3. A file-sharing system according to claim 1, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is modified during a time period from a time point when the file is migrated to a time point when a second snapshot is acquired, and wherein the processor of the file server executes the snapshot management information modification control for acquiring the second snapshot when receiving the snapshot acquisition request from the computer after the file is modified, and modifying the snapshot management information by using the acquired second snapshot, the file rewrite control for copying the file storage location management information at a time point when the second snapshot is acquired, and performing the rewriting for the modified file, and a file management control for copying the modified file to the volume for which a file system having a snapshot is created, and managing the copied file by using the second snapshot.

4. A file-sharing system according to claim 1, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is deleted during a time period from a time point when the file is migrated to a time point when a second snapshot is acquired, and wherein the processor of the file server executes the snapshot management information modification control for acquiring the second snapshot when receiving the snapshot acquisition request from the computer after the file is deleted, and modifying the snapshot management information by using the acquired second snapshot, and a file management control for avoiding to perform the rewriting for the deleted file while copying the file storage location management information at a time point when the second snapshot is acquired, and to manage the deleted file by using the second snapshot.

5. A file-sharing system according to claim 1, wherein the snapshot management information includes, for each snapshot, a mount path of the snapshot, a name of the snapshot, a name of the file storage location management information at a time point when the snapshot is acquired, and a creation time point for the snapshot, wherein the file storage location management information includes a file name, a file path, a file system which manages the file, a modification flag which determines whether or not the file is modified for each file as file information, and wherein the processor of the file server acquires file information of a file to be accessed by the file access request from the file storage location management information when receiving the file access request from the computer to set the value of the modification flag of the file information to a value representing that the file is modified when the file access request is write request, and executes file access processing to the file, and notifies the computer of the result of the file access processing.

6. A file server, that is communicably coupled to a storage device which has one or more volumes, and that manages files stored in the volumes by using one or more file systems created for the volumes, a unified file system which virtually integrates the file systems, and snapshots of at least one of the file systems which are acquired at one or more time points, comprising:

a memory that stores snapshot management information which includes mount paths of the snapshots, and represents the snapshots acquired at respective time points, and file storage location management information which includes file paths of the files, and represents storage locations of the files when the unified file system manages the files; and a processor that executes a snapshot management information modification control for acquiring a snapshot for a file system having the snapshot when receiving a snapshot acquisition request including a mount path of the snapshot from a computer, and modifying the snapshot management information by using the acquired snapshot, a file rewrite control for copying the file storage location management information at a time point when the snapshot is acquired, and rewriting file paths of files included in the copied file storage location management information by using a mount path of the acquired snapshot, and a file access control for performing a file access to the file managed by the acquired snapshot when receiving a file access request from a computer to the rewritten file which is stored in a volume for which a file system not having a snapshot is created.

7. A file server according to claim 6, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is not modified during a time period from a time point when the file is migrated to a time point when a second snapshot is acquired, and wherein the processor executes the snapshot management information modification control for acquiring the second snapshot when receiving the snapshot acquisition request from the computer with the file kept unmodified, and modifying the snapshot management information by using the acquired second snapshot, the file rewrite control for copying the file storage location management information at a time point when the second snapshot is acquired, and performing the rewriting for the unmodified file, and a link management control for creating a link to a file which is managed by the first snapshot in a volume for which a file system having the second snapshot is created, and managing the created link by using the second snapshot.

8. A file server according to claim 6, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is modified during a time period from a time point when the file is migrated to a time point when a second snapshot is acquired, and wherein the processor executes the snapshot management information modification control for acquiring the second snapshot when receiving the snapshot acquisition request from the computer after the file is modified, and modifying the snapshot management information by using the acquired second snapshot, the file rewrite control for copying the file storage location management information at a time point when the second snapshot is acquired, and performing the rewriting for the modified file, and a file management control for copying the modified file to the volume for which a file system having a snapshot is created, and managing the copied file by using the second snapshot.

9. A file server according to claim 6, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is deleted during a time period from a time point when the file is migrated to a time point when a second snapshot is acquired, and wherein the processor executes the snapshot management information modification control for acquiring the second snapshot when receiving the snapshot acquisition request from the computer after the file is deleted, and modifying the snapshot management information by using the acquired second snapshot, and a file management control for avoiding to perform the rewriting for the deleted file while copying the file storage location management information at a time point when the second snapshot is acquired, and to manage the deleted file by using the second snapshot.

10. A method for managing files in a file-sharing system that has a storage device that has one or more volumes, and a file server that manages files stored in the volumes by using one or more file systems created for the volumes, a unified file system which virtually integrates the file systems, and snapshots of at least one of the file systems which are acquired at one or more time points, wherein the storage device and the file server are communicably coupled to each other, the method comprising:

by the file server, storing snapshot management information which includes mount paths of the snapshots, and represents the snapshots acquired at respective time points;

by the file server, storing file storage location management information which includes file paths of the files, and represents storage locations of the files when the unified file system manages the files;

acquiring a snapshot for a file system having the snapshot when receiving a snapshot acquisition request including a mount path of the snapshot from a computer, and modifying the snapshot management information by using the acquired snapshot;

copying the file storage location management information at a time point when the snapshot is acquired, and rewriting file paths of files included in the copied file storage location management information by using a mount path of the acquired snapshot; and performing a file access to the file managed by the acquired snapshot when receiving a file access request from a computer to the rewritten file which is stored in a volume for which a file system not having a snapshot is created.

11. A method for managing files according to claim 10, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is not modified during a time period from a time point when the file is migrated to a time point when a second snapshot is acquired, wherein the file server acquires the second snapshot when receiving the snapshot acquisition request from the computer with the file kept unmodified, and modifies the snapshot management information by using the acquired second snapshot, wherein the file server copies the file storage location management information at a time point when the second snapshot is acquired, and performs the rewriting for the unmodified file, and wherein the file server creates a link to a file which is managed by the first snapshot in a volume for which a file system having the second snapshot is created, and manages the created link by using the second snapshot.

12. A method for managing files according to claim 10, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is modified during a time period from a time point when the file is migrated to a time point when a second snapshot is acquired, wherein the file server acquires the second snapshot when receiving the snapshot acquisition request from the computer after the file is modified, and modifies the snapshot management information by using the acquired second snapshot, wherein the file server copies the file storage location management information at a time point when the second snapshot is acquired, and performs the rewriting for the modified file, and wherein the file server copies the modified file to the volume for which a file system having a snapshot is created, and manages the copied file by using the second snapshot.

13. A method for managing files according to claim 10, wherein the file is migrated from the volume for which a file system having a snapshot is created to the volume for which a file system not having a snapshot is created, and is managed by a first snapshot which is acquired when the file is stored in the volume for which the file system having the snapshot is created, wherein the file is deleted during a time period from a time point when the file is migrated to a time point when a second snapshot is acquired, wherein the file server acquires the second snapshot when receiving the snapshot acquisition request from the computer after the file is deleted, and modifies the snapshot management information by using the acquired second snapshot, and wherein the file server avoid to perform the rewriting for the deleted file while copying the file storage location management information at a time point when the second snapshot is acquired, and to manage the deleted file by using the second snapshot.

* * * * *